United States Patent
Kang et al.

(10) Patent No.: US 12,438,255 B2
(45) Date of Patent: Oct. 7, 2025

(54) ELECTRONIC APPARATUS INCLUDING ANTENNA

(71) Applicant: SAMSUNG ELECTRONICS CO., LTD., Suwon-si (KR)

(72) Inventors: Kyungkyun Kang, Suwon-si (KR); Yongsub Lee, Suwon-si (KR); Jaeho Lim, Suwon-si (KR); Sangmin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 18/400,604

(22) Filed: Dec. 29, 2023

(65) Prior Publication Data
US 2024/0136701 A1    Apr. 25, 2024
US 2024/0235007 A9    Jul. 11, 2024

Related U.S. Application Data

(63) Continuation of application No. PCT/KR2022/009518, filed on Jul. 1, 2022.

(30) Foreign Application Priority Data

Jul. 1, 2021  (KR) .................. 10-2021-0086581

(51) Int. Cl.
*H01Q 1/24*    (2006.01)
*H01Q 1/38*    (2006.01)
(Continued)

(52) U.S. Cl.
CPC ............ *H01Q 1/243* (2013.01); *H01Q 1/38* (2013.01); *H01Q 1/44* (2013.01); *H04M 1/0277* (2013.01); *H04M 2201/38* (2013.01)

(58) Field of Classification Search
CPC ............ H01Q 1/243; H01Q 1/38; H01Q 1/44; H01Q 1/46; H04M 1/0277;
(Continued)

(56) References Cited

U.S. PATENT DOCUMENTS

2014/0009344 A1    1/2014  Zhu et al.
2017/0245032 A1    8/2017  Yoon et al.
(Continued)

FOREIGN PATENT DOCUMENTS

CN    111430893 A    7/2020
JP    5306840 B2    10/2013
(Continued)

OTHER PUBLICATIONS

Communication issued on Oct. 9, 2024 by the European Patent Office in European Patent Application No. 22833701.0.
(Continued)

*Primary Examiner* — David E Lotter
(74) *Attorney, Agent, or Firm* — Sughrue Mion, PLLC

(57) ABSTRACT

An electronic device includes a display, a rear cover, a first frame including a first portion in which at least one speaker hole is formed in a region and a second portion extending from the first portion in a first direction, a second frame coupled to the second portion of the first frame, a speaker disposed in a space between the second frame and the second portion of the first frame, an acoustic duct formed in the first frame, a film including a conductive pattern, and a wireless communication circuit electrically coupled to the first conductive pattern. The acoustic duct includes a first acoustic duct portion and a second acoustic duct portion, at least one region of the first film covers an entirety of the opening, and the wireless communication circuit is configured to feed power to a point of the first conductive pattern to receive a signal of a first frequency band.

20 Claims, 20 Drawing Sheets

(51) Int. Cl.
*H01Q 1/44* (2006.01)
*H04M 1/02* (2006.01)

(58) Field of Classification Search
CPC .. H04M 2201/38; H04M 1/02; H04M 1/0249; H04M 1/026; H04M 1/035; H04M 1/03
See application file for complete search history.

(56) References Cited

U.S. PATENT DOCUMENTS

| | | | |
|---|---|---|---|
| 2019/0067801 A1 | 2/2019 | Kang et al. | |
| 2020/0313284 A1 | 10/2020 | Kim et al. | |
| 2020/0329303 A1* | 10/2020 | Sim | H04R 1/028 |
| 2021/0006876 A1 | 1/2021 | Moon et al. | |
| 2021/0034119 A1* | 2/2021 | Yoon | G06F 1/1688 |

FOREIGN PATENT DOCUMENTS

| | | | |
|---|---|---|---|
| KR | 10-2012-0049056 A | 5/2012 | |
| KR | 10-2015-0027193 A | 3/2015 | |
| KR | 10-2017-0098009 A | 8/2017 | |
| KR | 10-1771456 B1 | 8/2017 | |
| KR | 10-2019-0023995 A | 3/2019 | |
| KR | 10-2075780 B1 | 2/2020 | |
| KR | 10-2020-0109903 A | 9/2020 | |
| KR | 10-2020-0114150 A | 10/2020 | |
| KR | 10-2020-0119105 A | 10/2020 | |
| KR | 10-2021-0003538 A | 1/2021 | |
| KR | 10-2234067 B1 | 3/2021 | |
| WO | 2021/002574 A1 | 1/2021 | |

OTHER PUBLICATIONS

International Search Report dated Oct. 21, 2022, issued by the International Searching Authority in International Application No. PCT/KR2022/009518 (PCT/ISA/210).
Written Opinion dated Oct. 21, 2022, issued by the International Searching Authority in International Application No. PCT/KR2022/009518 (PCT/ISA/237).

* cited by examiner

ELECTRONIC APPARATUS INCLUDING ANTENNA

CROSS REFERENCE TO RELATED APPLICATIONS

This application is a continuation of International Application No. PCT/2022/009518, filed on Jul. 1, 2022, which is based on and claims priority to Korean Patent Application No. 10-2021-0086581, filed on Jul. 1, 2021, in the Korean Intellectual Property Office, the disclosures of which are incorporated by reference herein in their entireties.

BACKGROUND

1. Field

The disclosure relates to an electronic device including an antenna.

2. Description of the Related Art

In general, an electronic device may include an audio module, such as a speaker, to provide a user with an audio service, and the speaker may be fixedly disposed to an inner space of the electronic device. Since one of main purposes of the speaker is to provide the audio service to the user outside the electronic device, the electronic device may have an acoustic duct disposed to radiate high-quality sound to outside of the electronic device via the speaker.

With a trend of small-sized electronic devices, the electronic device may include various types of antennas to efficiently utilize an inner space. For example, the electronic device may use a conductive pattern of a flexible printed circuit board (FPCB) as an antenna.

The inner space of the electronic device, to which the speaker is disposed, may be formed in various manners. The space to which the speaker is disposed may be formed in a semi-module type by combining frame structures. For example, the electronic device may include a first frame including a portion extending in parallel to a rear cover and a second frame disposed between the first frame and a display. In an example, the space to which the speaker is disposed may be formed by combining the first frame and the second frame.

The electronic device tends to be thinner in thickness according to various consumer demands, and it may be difficult for the electronic device to ensure a width of an acoustic duct and a resonance space for ensuring audio performance of the speaker. Therefore, in order to ensure the resonance space of the speaker disposed to an inner space in a semi-module type, the electronic device may include an additional acoustic duct passing through a portion of the first frame. In this case, since the acoustic duct is disposed by passing through the portion of the first frame, the electronic device may have to include a speaker sheet for covering an opening formed at the portion of the first frame to prevent sound from leaking. However, since the speaker sheet is disposed, a region of the first frame to which the speaker sheet is disposed is not be able to have an antenna (e.g., an FPCB antenna) disposed thereon, which may reduce a space for antenna disposition, thereby resulting in limitations in an antenna design.

SUMMARY

According to an aspect of the disclosure, an electronic device includes: a display disposed at a front surface of the electronic device; a rear cover forming a rear surface of the electronic device; a first frame including: a first portion which forms a first side surface of the electronic device and having at least one speaker hole therein; and a second portion extending from the first portion and parallel to the rear cover in a first direction toward an inside of the electronic device, wherein at least one of the first portion and the second portion may include a non-conductive material, and a second frame between the display and the second portion of the first frame and coupled to the second portion of the first frame; a speaker disposed in a first space between the second frame and the second portion of the first frame; an acoustic duct provided in the first frame, the acoustic duct including: a first acoustic duct portion extending from the first space to the at least one speaker hole across the second portion of the first frame and the first portion, and a second acoustic duct portion extending from the first acoustic duct portion in a second direction toward the rear cover, to provide an opening in the second portion of the first frame; a film including a conductive pattern, wherein the film is disposed on a surface of the second portion of the first frame, and at least a portion of the film covers an entirety of the opening; and a wireless communication circuit electrically coupled to the conductive pattern and configured to feed power to a point of the conductive pattern to receive a signal of a first frequency band.

The film may include: a first region covering the entirety of the opening; and a second region extending from the first region and adjacent to the first portion of the first frame.

The film may further include a first layer provided in only the second region of the film and formed of copper.

The conductive pattern may extend from a first point of the first region to a second point of the second region.

A portion of the conductive pattern may be elongated from the second region to the first side surface.

The film may include a first layer formed of a conductive material.

The first layer may be formed in a mesh pattern.

The wireless communication circuit may be further configured to feed power to the first layer to receive a signal of a second frequency band.

The film may include a first layer including at least one of graphite and ferrite.

The film may be a flexible printed circuit board.

The first portion of the first frame may include a conductive material, and the second portion of the first frame may include the non-conductive material.

The first frame may include the non-conductive material.

The acoustic duct may connect the first space to an outside of the electronic device, and the acoustic duct may be configured to radiate sound radiated by the speaker to the outside of the electronic device.

The second frame may be coupled to a rear surface of the display.

At least a portion of the rear cover may include a non-conductive material.

According to one or more embodiments of the disclosure, an electronic device may further ensure an antenna disposition space since a film disposed on a surface of a first frame and including a conductive pattern covers an opening of an additional acoustic duct.

In addition, according to one or more embodiments, the electronic device utilizes the film including the conductive pattern as an antenna radiator and a speaker sheet, thereby simplifying a manufacturing process and saving cost.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure are described with reference to the accompanying drawings. However, it should be appreciated that the embodiments described herein are example embodiments, and thus, the disclosure is not limited thereto and embodiments may include various modifications, equivalents, and/or alternatives.

Figure 1:
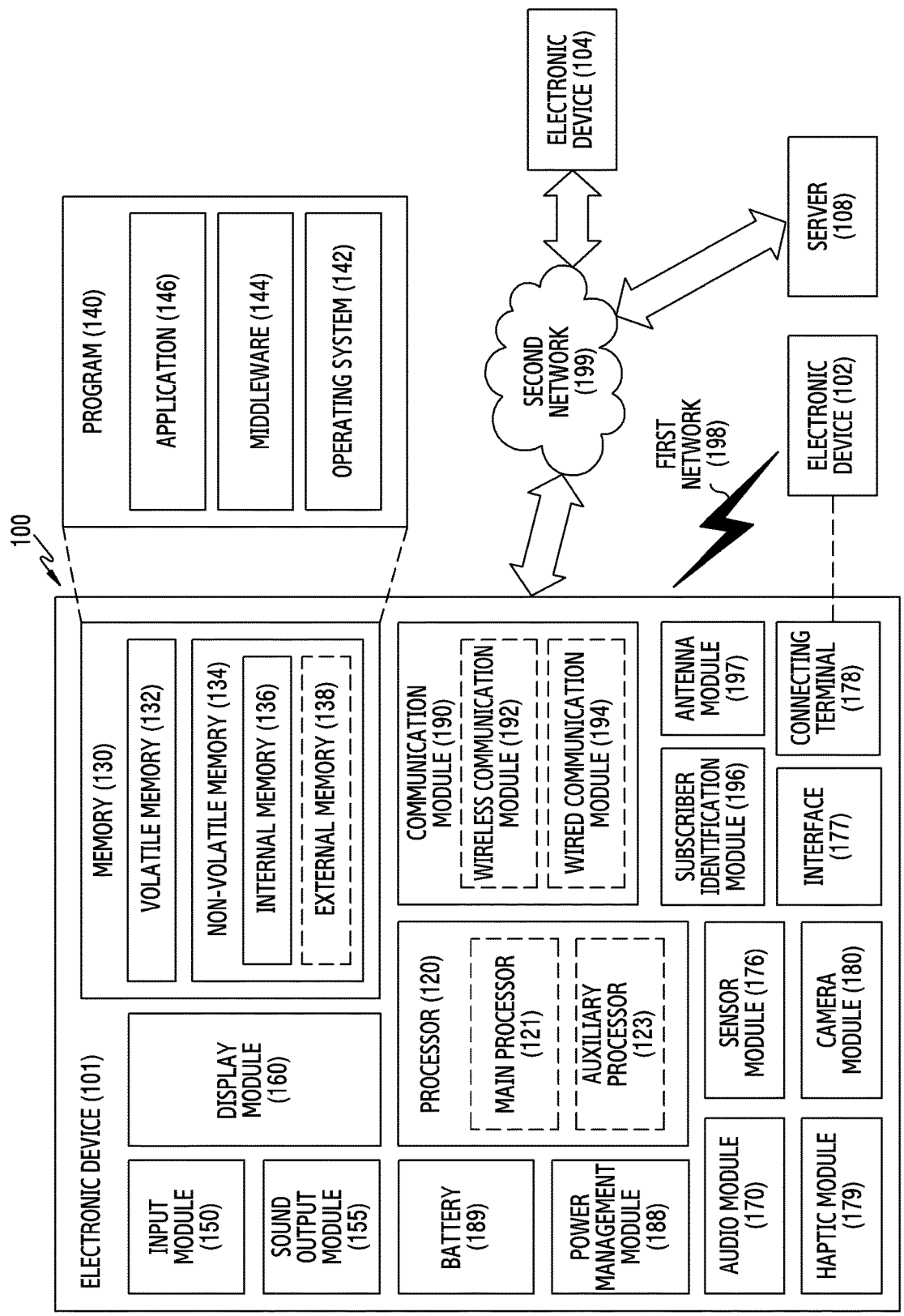
FIG. 1 is a block diagram illustrating an electronic device in a network environment according to one or more embodiments of the disclosure.

FIG. 1 is a block diagram illustrating an electronic device 101 in a network environment 100 according to one or more embodiments of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, one or more of the components (e.g., the connecting terminal 178) may be omitted from the electronic device 101, and/or one or more other components may be added in the electronic device 101. In some embodiments, some of the components (e.g., the sensor module 176, the camera module 180, or the antenna module 197) may be implemented as a single component (e.g., the display module 160).

The processor 120 may execute software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. An artificial intelligence model may be generated by machine learning. Such learning may be performed by the electronic device 101 where the artificial intelligence is performed or via a separate server (e.g., the server 108). Learning algorithms may include, but are not limited to, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen).

The sound output module 155 may output sound signals to the outside of the electronic device 101. The sound output module 155 may include a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display module 160 may include, a display, a hologram device, or a projector and control circuitry to control a corresponding one of the display, hologram device, and projector. According to one or more embodiments, the display module 160 may include a touch sensor adapted to detect a touch, or a pressure sensor adapted to measure the intensity of force incurred by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., via a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., via a wire) or wirelessly. According to one or more embodiments, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). The wireless communication module 192 and the wired communication module 194 may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). The wireless communication module 192 and the wired communication module 194 may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197. According to one or more embodiments, the antenna module 197 may form a mmWave antenna module. According to one or more embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. According to one or more embodiments, the external electronic device 104 may include an internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 2A:
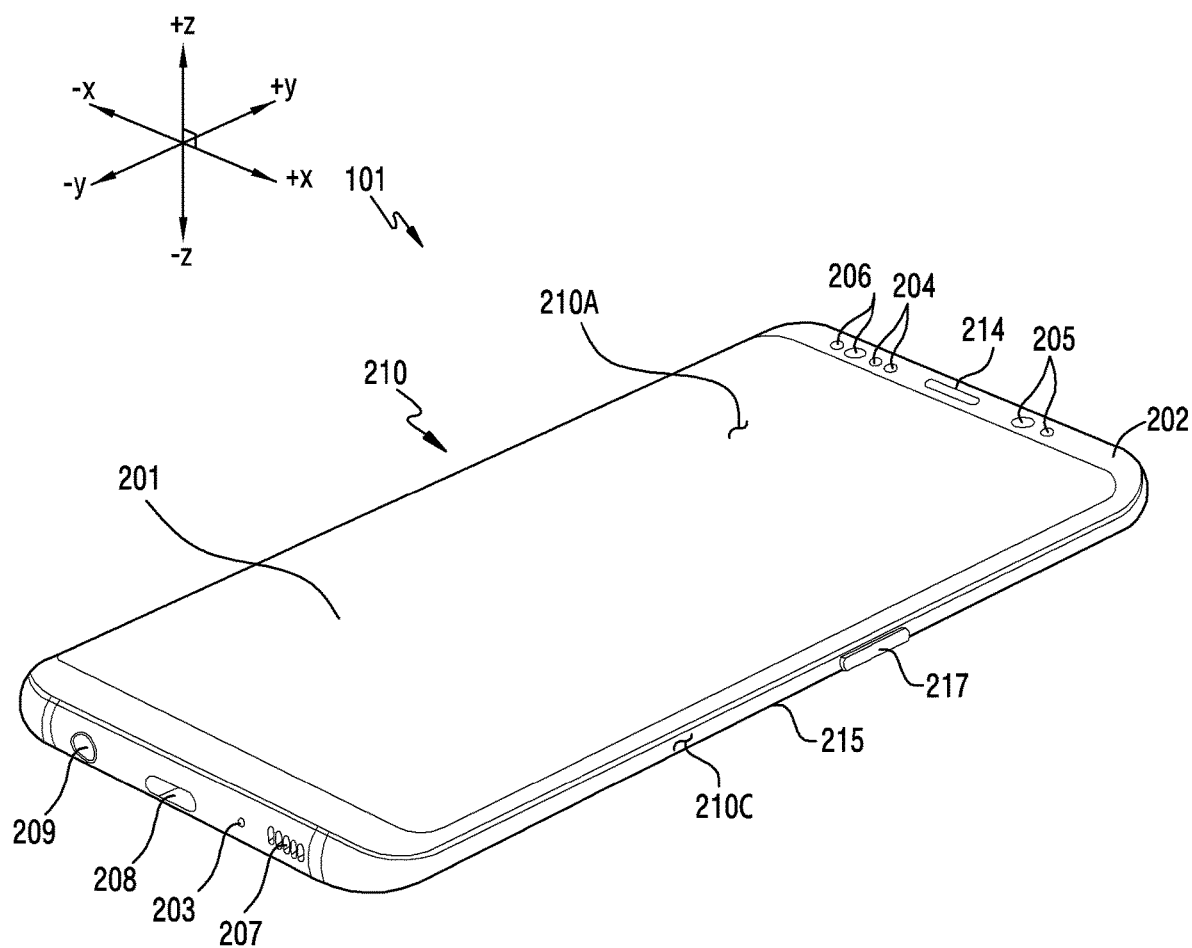
FIG. 2A is a perspective view illustrating an electronic device according to one or more embodiments of the disclosure.

FIG. 2A is a perspective view illustrating an electronic device according to one or more embodiments.

Figure 2B:
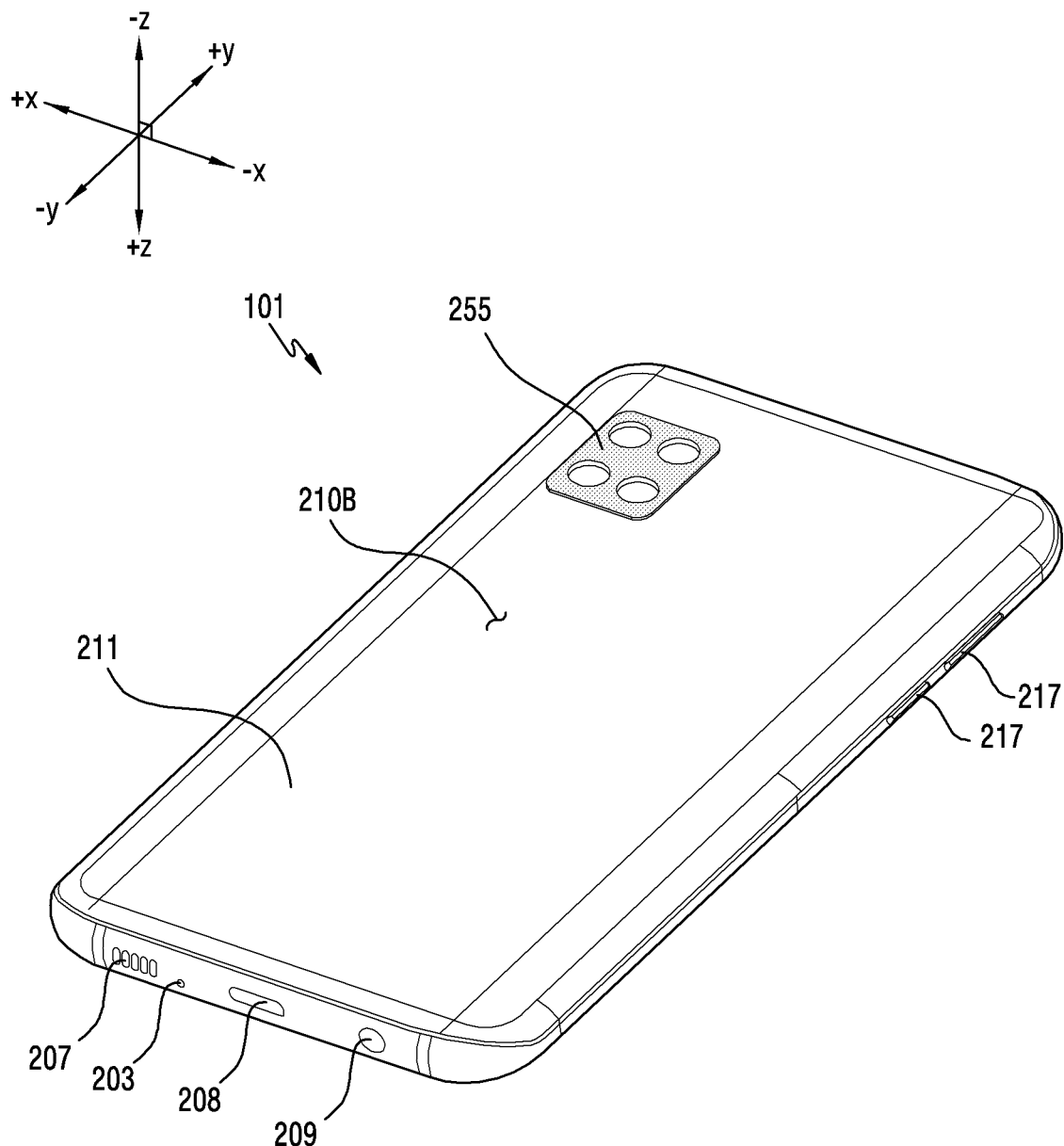
FIG. 2B is a rear perspective view illustrating the electronic device of FIG. 2A according to one or more embodiments of the disclosure.

FIG. 2B is a rear perspective view illustrating the electronic device of FIG. 2A.

Referring to FIG. 2A and FIG. 2B, the electronic device 101 according to one or more embodiments may include a housing 210 including a first surface (or a front surface) 210A, a second surface (or a rear surface) 210B, and a side surface (or a sidewall) 210C surrounding a space between the first surface 210A and the second surface 210B. In one or more embodiments, the housing may refer to a structure which forms part of the first surface 210A, second surface 210B, and side surface 210C of FIG. 2A and FIG. 2B.

According to one or more embodiments, the first surface 210A of the electronic device 101 may be formed by a front plate 202 (e.g., a polymer plate or a glass plate including various coating layers) which is at least partially transparent in practice. According to one or more embodiments, the front plate 202 may include a curved portion seamlessly extending by being bent from the first surface 210A toward a rear plate 211 in at least one side edge portion.

According to one or more embodiments, the second surface 210B may be formed by the rear plate 211 which is opaque in practice. The rear plate 211 may be formed of coated or colored glass, ceramic, polymer, metallic materials (e.g., aluminum, stainless steel (STS), or magnesium) or a combination of at least two of the materials. According to one or more embodiments, the rear plate 211 may include a curved portion seamlessly extending by being bent from the second surface 210B toward the front plate 202 in at least one side edge portion.

According to one or more embodiments, the side surface 210C of the electronic device 101 may be coupled to the front plate 202 and the rear plate 211, and may be formed by a first frame 215 including at least one of or more of metal and polymer. According to one or more embodiments, the rear plate 211 and the first frame 215 may be formed integrally, and may include substantially the same material (e.g., a metallic material such as aluminum).

According to one or more embodiments, the electronic device 101 may include at least one of a display 201, the audio module 170, a sensor module 204, a first camera module 205, a key input device 217, a first connector hole 208, and a second connector hole 209. According to one or more embodiments, at least one of components (e.g., the key input device 217) may be omitted in the electronic device 101, or other components may be additionally included. For example, a sensor such as a proximity sensor or an illuminance sensor may be integrated to the display 201 in a region provided by the front plate 202, or may be disposed at a location adjacent to the display 201. According to one or more embodiments, the electronic device 101 may further include a light emitting element 206, and the light emitting element 206 may be disposed at a location adjacent to the display 201 in the region provided by the front plate 202. The light emitting element 206 may provide, for example, state information of the electronic device 101 in an optical form. According to one or more embodiments, the light emitting element 206 may provide, for example, a light source interworking with an operation of the first camera module 205. The light emitting element 206 may include, for example, an LED, an IR LED, and a xenon lamp.

The display 201 may be exposed through, for example, some portions of the front plate 202. According to one or more embodiments, an edge of the display 201 may be formed to be substantially the same as a shape of a periphery (e.g., a curved surface) adjacent to the front plate 202. According to one or more embodiments, in order to expand an area in which the display 201 is exposed, the display 201 and the front plate 202 may be formed to have substantially the same interval between peripheries thereof. According to one or more embodiments, a recess or an opening may be formed at a portion of a screen display region of the display 201, and other electronic components, for example, the first camera module 205 and a proximity sensor or illuminance sensor which are aligned with the recess or the opening, may be included.

According to one or more embodiments, the display 201 may be disposed adjacent to or joined with a touch sensing circuit, a pressure sensor capable of measuring touch strength (pressure), and/or a digitizer for detecting a magnetic-type stylus pen.

According to one or more embodiments, the audio module 107 may include a microphone hole 203, at least one speaker hole 207, and a communication receiver hole 214. The microphone hole 203 may have a microphone disposed inside thereof to acquire external sound, and in one or more embodiments, may have a plurality of microphones disposed to sense a sound direction. According to one or more embodiments, the at least one speaker hole 207 and the communication receiver hole 214 may be implemented as one hole together with the microphone hole 203, or the speaker (e.g., a piezo speaker) may be included without the at least one speaker hole 207 and the communication receiver hole 214.

According to one or more embodiments, the electronic device 101 may include the sensor module 204 to generate an electrical signal or data value corresponding to an internal operational state of the electronic device 101 or an external environmental state. The sensor module 204 may further include a proximity sensor disposed adjacent to the first surface 210A of the housing 210, a fingerprint sensor disposed integrally or adjacent to the display 201, and or a biometric sensor (e.g., a Heart Rate Monitoring (HRM) sensor) disposed to the second surface 210B of the housing 210. The electronic device 101 may further include at least one of senor modules such as a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, and an illuminance sensor.

According to one or more embodiments, the electronic device 101 may include a second camera module 255 disposed to the second surface 210B. The first camera module 205 and the second camera module 255 may include one or more lenses, an image sensor, and/or an image signal processor. A flash may be disposed to the second surface 210B. The flash may include, for example, a light emitting diode (LED) or a xenon lamp. According to one or more embodiments, at least two or more lenses (infrared cameras, wide-angle and telephoto lenses) and image sensors may be disposed to a surface of the electronic device 101.

According to one or more embodiments, the key input device 217 may be disposed to the side surface 210C of the housing 210. According to one or more embodiments, the electronic device 101 may not include the entirety or part of the aforementioned key input device 217. The key input device 217, which is not included, may be implemented on the display 201 in a different form such as a soft key or the like. According to one or more embodiments, the key input device may include at least part of the fingerprint sensor disposed to the second surface 210B of the housing 210.

According to one or more embodiments, the connector holes 208 and 209 may include the first connector hole 208 capable of housing a connector (e.g., a USB connector) for transmitting/receiving power and data with respect to at least one or more of an external electronic device, and the second connector hole (e.g., earphone jack) 209 capable of housing a connector for transmitting/receiving an audio signal with respect to the external electronic device.

Figure 3:
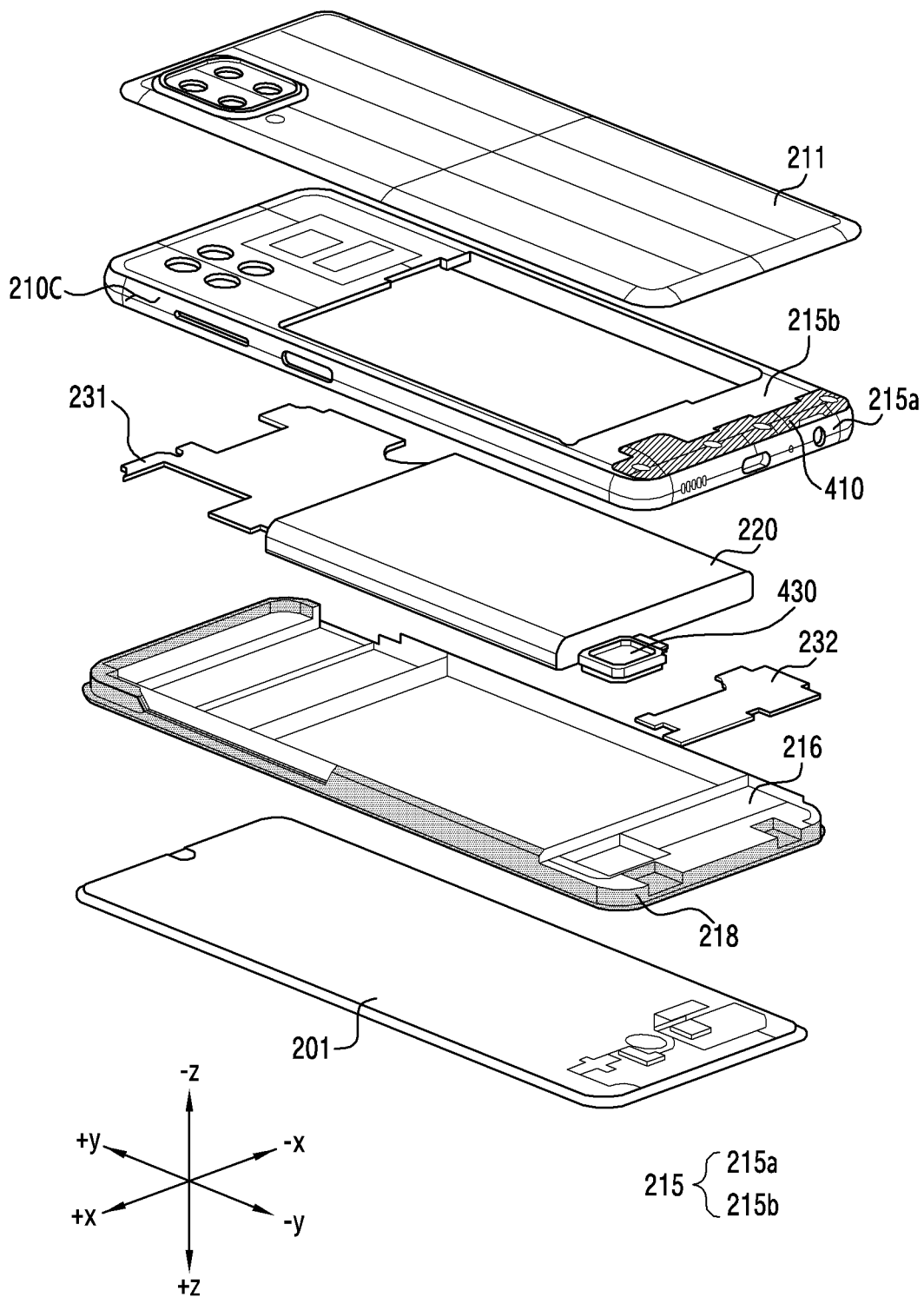
FIG. 3 is an exploded perspective view of an electronic device according to one or more embodiments of the disclosure.

FIG. 3 is an exploded perspective view of an electronic device according to one or more embodiments.

Referring to FIG. 3, the electronic device 101 may include the rear cover 211, the first frame 215, a first film 410, a first PCB 231, a battery 220, a second PCB 232, a speaker 430, a second frame 216, a support member 218, and the display 201.

According to one or more embodiments, the first frame 215 may include a first portion 215a forming the side surface 210C of the electronic device 101 and a second portion 215b extending from the first portion 215a and extending in parallel to the rear cover 211. In one or more embodiments, at least part of the first frame 215 may be formed of a non-conductive material (e.g., polymer). For example, the entirety of the first frame 215 may be formed of the non-conductive material. That is, the first portion 215a and second portion 215b of the first frame 215 may be formed of the non-conductive material. As another example, the first portion 215a of the first frame 215, forming the side surface 210C of the electronic device 101, may be formed of a conductive material (e.g., metal), and the second portion 215b may be formed of the non-conductive material. In a state in which the first portion 215a is formed of the conductive material, the electronic device 101 may utilize the first portion 215a as an antenna radiator for transmitting and/or receiving a radio frequency (RF) signal of a specified frequency band.

According to one or more embodiments, the first film 410 (e.g., an FPCB) may be disposed to the second portion 215b of the first frame 215. The first film 410 may include a conductive pattern, and the electronic device 101 may utilize the conductive pattern of the first film 410 as the antenna radiator. The structure of the first film 410 and the disposition of the second portion 215b of the first frame 215 are described below in greater detail with reference to FIG. 4.

According to one or more embodiments, the first PCB 231 and the second PCB 232 may be disposed between the first frame 215 and the second frame 216. The first PCB 231 and/or the second PCB 232 may be supported by the first frame 215 and/or the second frame 216. According to one or more embodiments, the processor 120, the memory 130, and/or the wireless communication circuit and the interface 177 may be disposed to the first PCB 231 and/or the second PCB 232. According to one or more embodiments, the first PCB 231 and/or the second PCB 232 may provide an electric connection path between various components of the electronic device 101. For example, the battery 220, the display 201, and the processor 120 may be electrically coupled to the first PCB 231 and/or the second PCB 232 directly or indirectly, and the processor 120 may be electrically coupled to the battery 220 and the display 201 via an electric connection path provided by the first PCB 231 and/or the second PCB 232.

According to one or more embodiments, the battery 220 may be fixed by the second frame 216 and disposed inside the electronic device 101. The battery 220 may store power required in the electronic device 101. For example, the battery 220 may include a non-rechargeable primary cell, a rechargeable secondary cell, or a fuel cell. The battery 220 may be disposed integrally inside the electronic device 101, or may be detachably disposed with respect to the electronic device 101.

According to one or more embodiments, the second frame 216 may be coupled with the first frame 215 forming the side surface 210C of the electronic device 101. According to one or more embodiments, the second frame 216 may support various components of the electronic device 101, or may provide a space capable of fixing the component of the electronic device 101. For example, the second frame 216 may provide a space for fixing the battery 220. For another example, the second frame 216 may be coupled with the first frame 215 to form an inner space for disposing the speaker 430. According to one or more embodiments, the second frame 216 may include metal and/or non-metal (e.g., polymer).

According to one or more embodiments, the support member 218 may be disposed in a first direction (e.g., a −z direction) of the display 201 to support the display 201. According to one or more embodiments, the support member 218 may be coupled with the second frame 216. The support member 218 may include metal and/or non-metal (e.g., polymer).

According to one or more embodiments, the rear cover 211 may be disposed in a first direction (e.g., a −z direction) of the first frame 215. According to one or more embodiments, the rear cover 211 may be physically coupled with the first frame 215. For example, the rear cover 211 may be coupled with the first frame 215 by means of at least one coupling member (e.g., a screw). For another example, the rear cover 211 may be coupled with the first frame 215 by means of an adhesive member (e.g., an adhesive tape or an adhesive solution). According to one or more embodiments, the rear cover 211 may be formed of coated or colored glass, ceramic, polymer, metallic materials (e.g., aluminum, stainless steel, or magnesium) or a combination of at least two of these materials. The rear cover 211 may include a curved portion seamlessly extending by being bent toward the first frame 215 forming at least part of the side surface.

Figure 4:
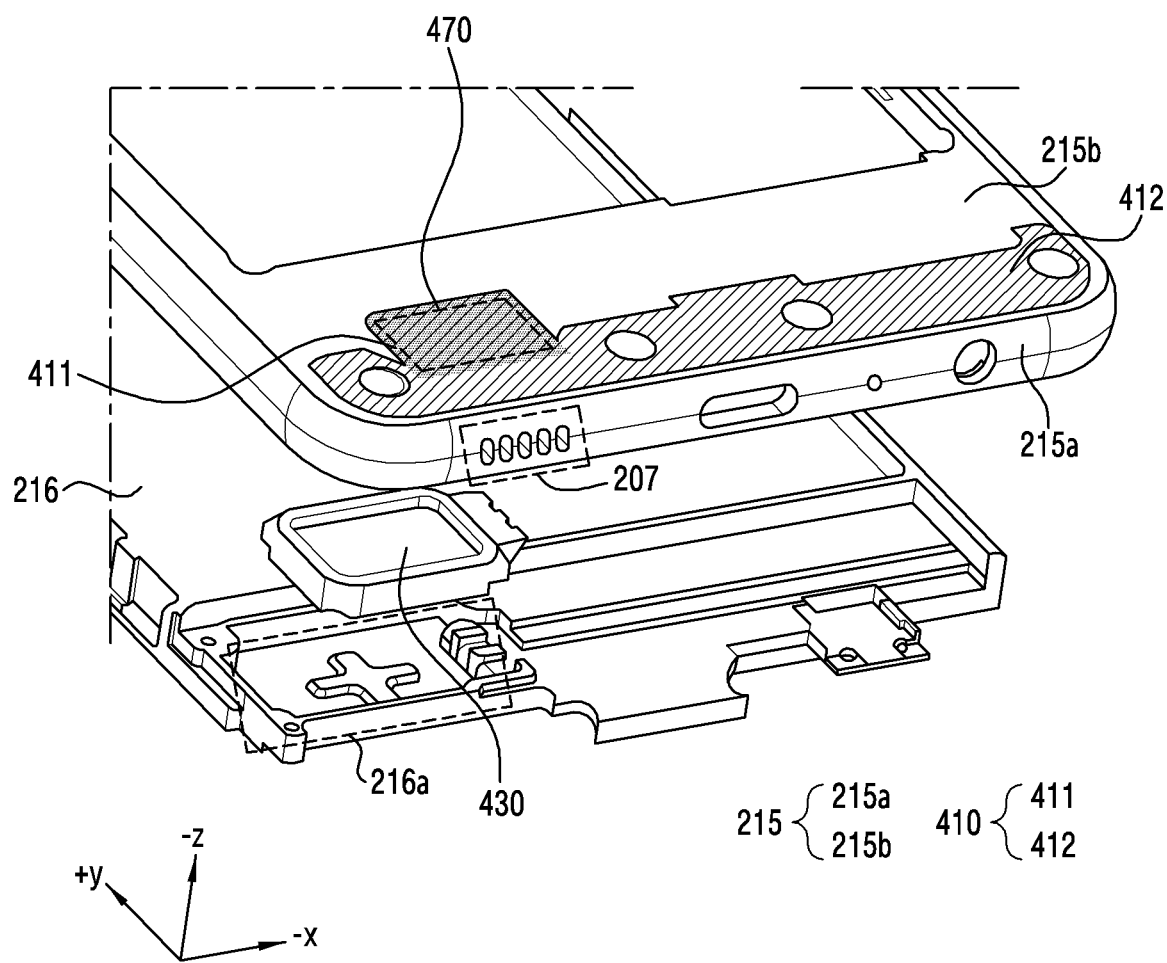
FIG. 4 illustrates a first film disposed to a second portion of a first frame according to one or more embodiments of the disclosure.

FIG. 4 illustrates a first film disposed to a second portion of a first frame according to one or more embodiments.

Referring to FIG. 4, according to one or more embodiments, a space 216a between the first frame 215 and the second frame 216 may be formed as the first frame 215 and the second frame 216 are coupled. According to one or more embodiments, the speaker 430 may be disposed to the space 216a. According to one or more embodiments, the second portion 215b of the first frame 215 may include an opening 470 formed in a region. The opening 470 may be formed to ensure a resonance space of the speaker 430. According to one or more embodiments, the opening 470 may be formed to pass through the second portion 215b in a direction perpendicular to the second portion 215b. According to one or more embodiments, the opening 470 may be formed at the second portion 215b to have a specified distance to a speaker hole formed at the first portion 215a of the first frame 215.

According to one or more embodiments, the first film 410 may be disposed to the second portion 215b of the first frame 215. The first film 410 may include a first region 411 covering the entirety of the opening 470 and a second region 412 extending from the first region 411 and disposed adjacent to the first portion 215a of the first frame 215. For example, the first region 411 may be a region corresponding to the opening 470 in the first film 410, and the second region 412 may be a region other than the first region in the first film 410. The first region 411 may be a region overlapping with the opening 470 when viewed from above the first film 410, and the second region 412 may be a region not overlapping with the opening 470 in the first film 410. According to one or more embodiments, the first film 410 may include a conductive pattern, and the electronic device 101 may transmit and/or receive an RF signal of a specified frequency band, based on the conductive pattern. According to one or more embodiments, the first film 410 may include various shapes of conductive patterns formed in the first region 411 and second region 412, which will be described below with reference to FIG. 6A, FIG. 6B, FIG. 6C, and FIG. 6D.

Figure 5A:
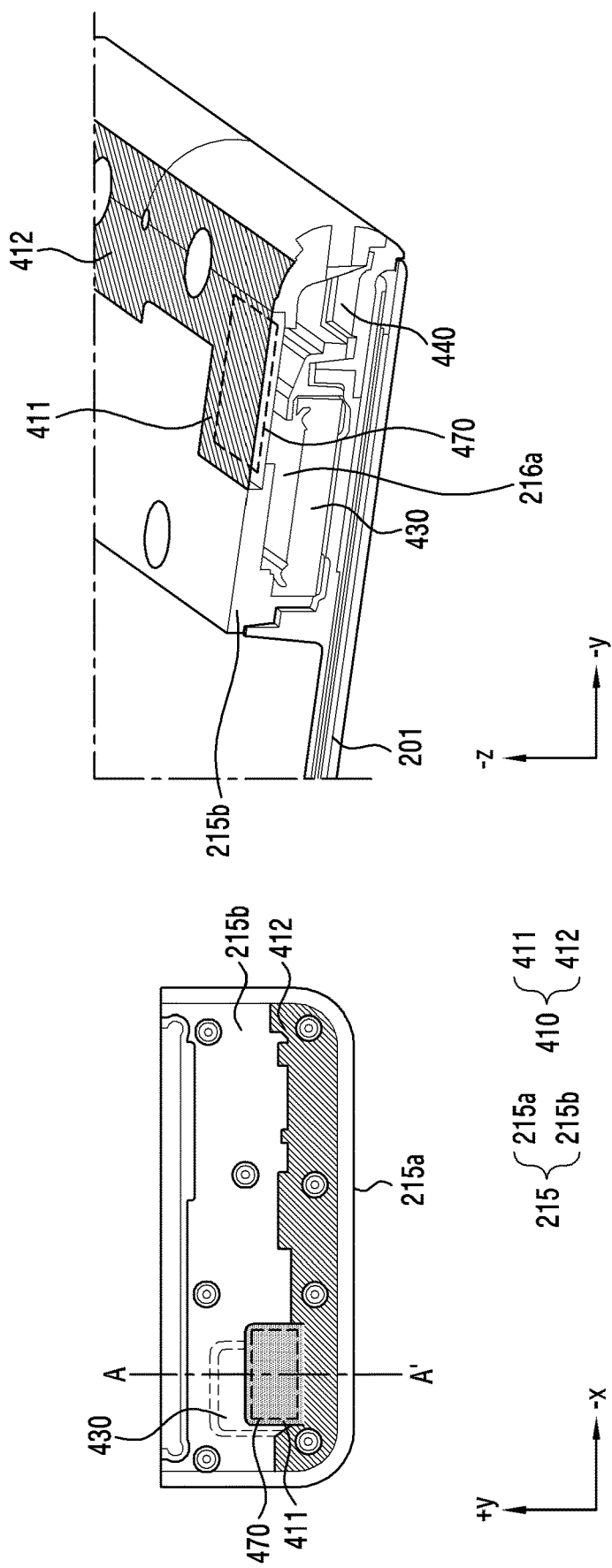
FIG. 5A illustrates an inner structure of an electronic device to which a speaker is disposed and a perspective view of a A-A' cross-section according to one or more embodiments of the disclosure.

FIG. 5A illustrates an inner structure of an electronic device to which a speaker is disposed and a perspective view of a A-A' cross-section according to one or more embodiments.

Figure 5B:
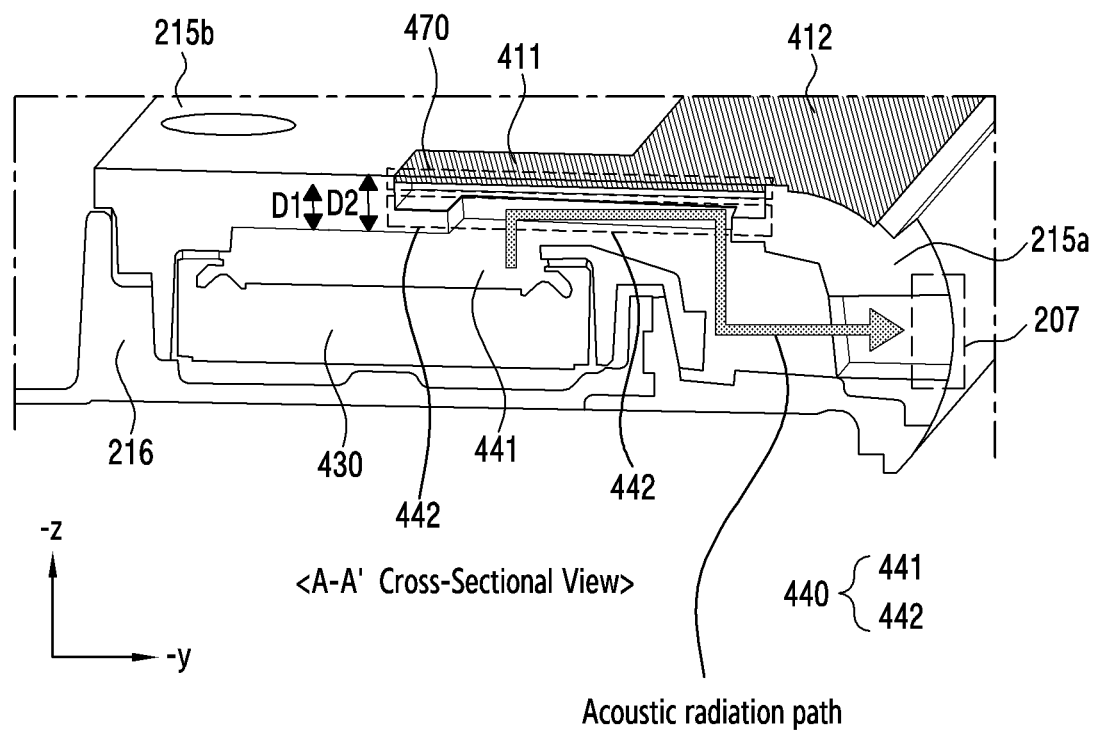
FIG. 5B illustrates an A-A' cross-sectional view according to one or more embodiments of the disclosure.

FIG. 5B illustrates an A-A' cross-sectional view according to one or more embodiments.

Referring to FIG. 5A and FIG. 5B, the electronic device 101 according to one or more embodiments may include an acoustic duct 440 formed in the first frame 215. According to one or more embodiments, the acoustic duct 440 may include a first acoustic duct portion 441 extending from the space 216a to the at least one speaker hole 207 across the second portion 215b and first portion 215a of the first frame 215. The acoustic duct 440 may include a second acoustic duct portion 442 extending from a portion of the first acoustic duct portion 441 to form the opening 470 at the second portion 215b of the first frame 215. According to one or more embodiments, sound radiated by the speaker 430 may be radiated to the outside of the electronic device 101 through the acoustic duct 440 and at least one speaker hole 207. The acoustic radiation path of FIG. 5B is illustrated for convenience of explanations, and an actual radiation path may be formed variously along the acoustic duct 440.

According to one or more embodiments, the electronic device 101 may improve quality of sound radiated by the speaker 430 via the second acoustic duct portion 442. According to one or more embodiments, in a state in which the second acoustic duct portion 442 is not present, the electronic device 101 may include the second acoustic duct portion 442 in order to ensure a resonance space of sound radiated from the speaker 430 and improve sound quality. According to one or more embodiments, the opening 470 may be formed at a portion overlapping at least in part with the speaker 430 in the second portion 215b when viewed from above.

According to one or more embodiments, the first film 410 may be disposed to a surface of the second portion 215b of the first frame 215. Since the first region 411 of the first film 410 covers the opening 470 formed at the second portion 215b of the first frame 215, the electronic device 101 may ensure a resonance space for sound radiated by the speaker 430 relatively compared to a case where an additional speaker sheet covers the opening 470. For example, when an additional speaker sheet is disposed at a center of the second acoustic duct portion 442 of the acoustic duct 440 in order to prevent the sound from leaking to the outside of the acoustic duct 440, the electronic device 101 may ensure a resonance space having a first depth D1 at the second acoustic duct portion 442. On the other hand, according to one or more embodiments, when the first region 411 of the first film 410 covers the opening 470 of the first frame 215, the electronic device 101 may ensure a resonance space having a second depth D2 greater than the first depth D1 at the second acoustic duct portion 442. Therefore, the electronic device 101 may ensure a relatively greater resonance space when the opening 470 is covered by utilizing the first film 410 than a case where an additional speaker sheet is disposed at the center of the second acoustic duct portion 442.

Figure 6A:
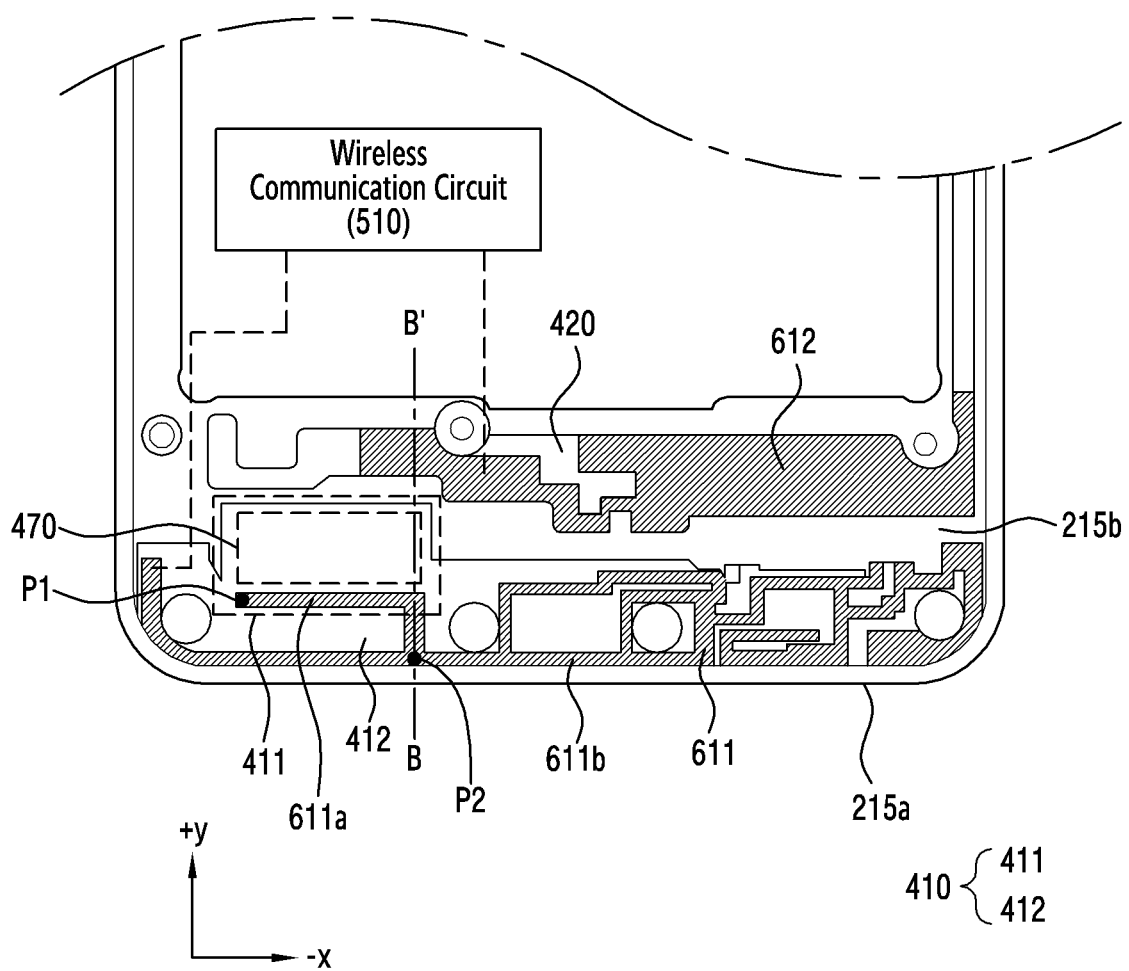
FIG. 6A illustrates a first conductive pattern and a second conductive pattern according to one or more embodiments of the disclosure.

FIG. 6A illustrates a first conductive pattern and a second conductive pattern according to one or more embodiments.

Figure 6B:
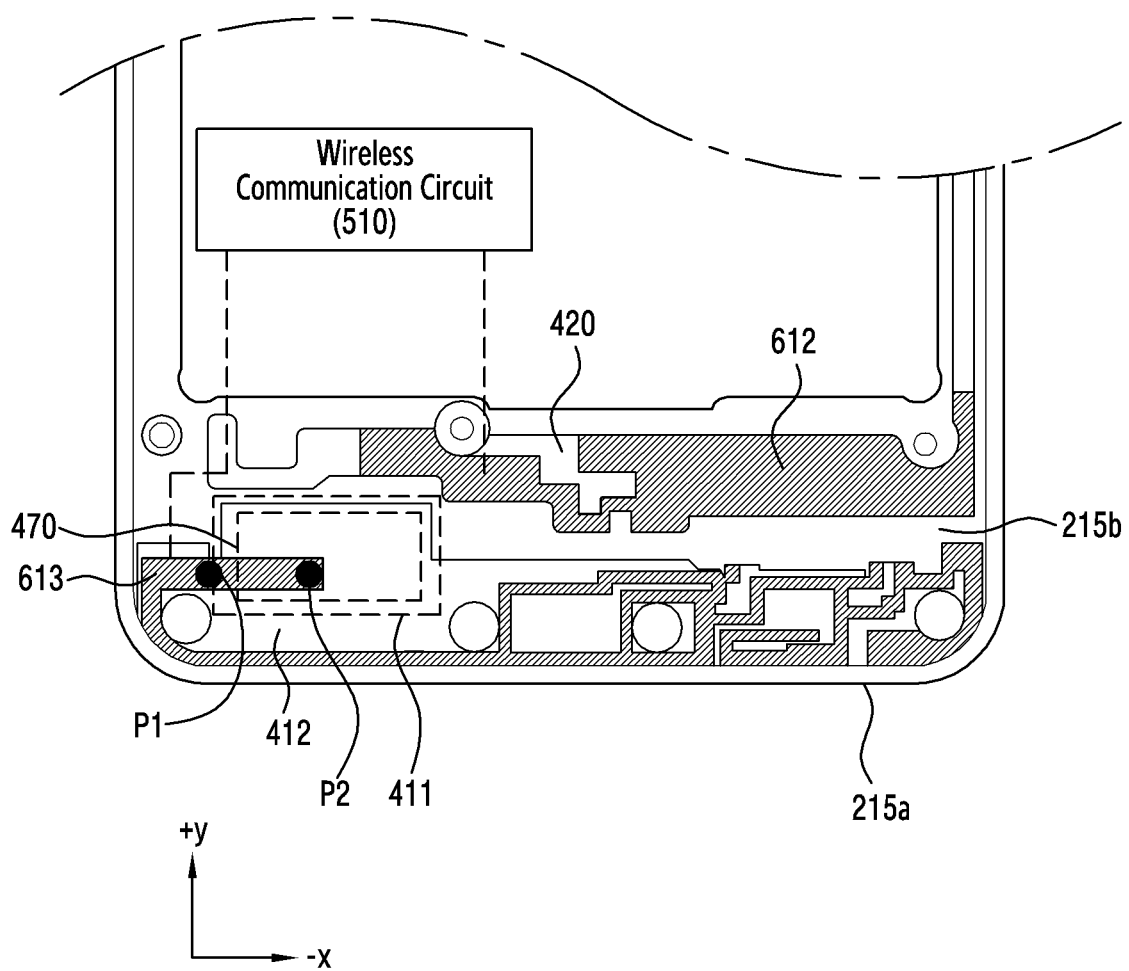
FIG. 6B illustrates a third conductive pattern according to one or more embodiments of the disclosure.

Referring to FIG. 6A, the electronic device 101 according to one or more embodiments may include the first film 410 disposed to the second portion 215b of the first frame 215. For example, the first film 410 may be disposed to an end of the electronic device 101 or the second portion 215b of the first frame 215 so as to be adjacent to the end. As another example, the first film 410 may be disposed adjacent to an edge of the electronic device 101. For example, the first film 410 may be disposed adjacent to the edge of the electronic device 101, formed by the first portion 215a of the first frame 215. As another example, the first film 410 may be disposed along the edge formed by the first portion 215a of the first frame 215. The edge formed by the first frame 215 may correspond to a lower edge of the electronic device 101. According to one or more embodiments, the first film 410 may include a first conductive pattern 611. The first conductive pattern 611 may include a first portion 611a extending from a first point P1 of the first region 411 to a second point P2 of the second region 412. According to one or more embodiments, the first conductive pattern 611 may include a second portion 611b formed to be long along the first portion 215a of the first frame 215. The second portion 611b of the first conductive pattern 611 may be formed to be long in a first direction (e.g., an x-axis direction). Although only the first conductive pattern 611 is illustrated in FIG. 6A in a shaded manner to describe the first conductive pattern 611 in the first film 410, the first region 411 and second region 412 of the first film 410 may also be disposed substantially to the second portion 215b as illustrated in FIG. 5A and FIG. 5B. Therefore, although the first film 410 is not illustrated in FIG. 6A in the shaded manner, it shall be understood that the first film 410 of FIG. 5A and FIG. 6B is also substantially disposed in FIG. 6A, and it shall be understood that the first conductive pattern 611 is formed in the first film 410 or included in the first film 410.

According to one or more embodiments, the electronic device 101 may include a wireless communication circuit 510, and the wireless communication circuit 510 may feed power to the first conductive pattern 611 to transmit and/or receive an RF signal of a specified frequency band. For example, the specified frequency band may include 600 to 1000 MHz bands. However, the 600 to 1000 MHz frequency bands are an example, and the specified frequency band may vary depending on an electrical length and/or impedance matching of the first conductive pattern 611.

According to one or more embodiments, in a state in which the first region 411 of the first film 410 covers the opening 470, the electronic device 101 may relatively more ensure a region in which the first conductive pattern 611 is formed than a case where an additional speaker sheet covers the opening 470. For example, when the additional speaker sheet covers the opening 470, a conductive pattern may be formed in a region corresponding to the first region 411. As a result, the conductive pattern may be formed limitedly in a region corresponding to the second region 412, and accordingly, a conductive pattern used as an antenna radiator may be restricted in design. Therefore, it may be difficult for the electronic device 101 to ensure radiation performance of an antenna. On the other hand, since the first region 411 of the first film 410 covers the opening 470 as in an embodiment, the first conductive pattern 611 formed in the first film 410 may also be formed in not only the second region 412 but also the first region 411. Therefore, the first region 411 of the first film 410 may cover the opening 470 to prevent sound from leaking to the outside of the acoustic duct 440, and may allow at least part of the first conductive pattern 611 to be formed in at least one portion, thereby improving antenna radiation performance.

According to one or more embodiments, the electronic device 101 may include a second film 420 disposed to the second portion 215b of the first frame 215. According to one or more embodiments, the second film 420 may include a second conductive pattern 612. According to one or more embodiments, the wireless communication circuit 510 may feed power to a point of the second conductive pattern 612 to transmit or receive an RF signal of a specified frequency band.

According to one or more embodiments, the electronic device 101 may not include the second film 420. For example, the electronic device 101 may not include the second film 420, and may include only the first film 410.

FIG. 6B illustrates a third conductive pattern according to one or more embodiments.

Referring to FIG. 6B, a third conductive pattern 613 may be formed in the first film 410 according to one or more embodiments. The third conductive pattern 613 may have a shape different from the first conductive pattern 611 of FIG. 6A. For example, a portion of the third conductive pattern 613 may extend in a first direction (e.g., a −x direction) from a first point P1 of the second region 412 of the first film 410 and be formed up to a second point P2 of the first region 411.

According to one or more embodiments, the wireless communication circuit 510 may feed power to the third conductive pattern 613 to transmit and/or receive an RF signal of a specified frequency band. For example, the specified frequency band may include 600 to 1000 MHz bands. However, the 600 to 1000 MHz frequency bands are an example, and the specified frequency band may vary depending on an electrical length and/or impedance matching of the third conductive pattern 613.

Figure 6C:
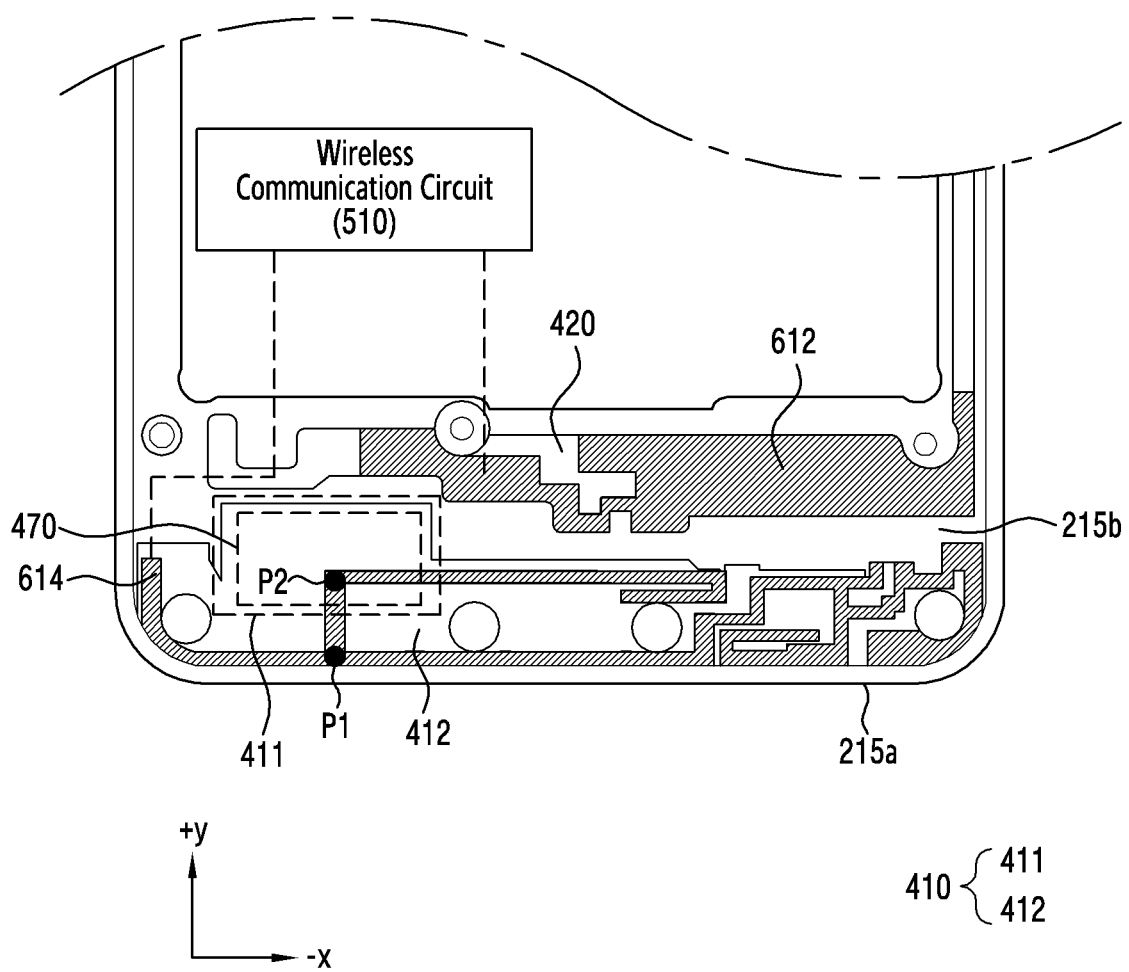
FIG. 6C illustrates a fourth conductive pattern according to one or more embodiments of the disclosure.

FIG. 6C illustrates a fourth conductive pattern according to one or more embodiments.

Referring to FIG. 6C, a fourth conductive pattern 614 may be formed in the first film 410 according to one or more embodiments. The fourth conductive pattern 614 may have a shape different from the first conductive pattern 611 of FIG. 6A. For example, a portion of the fourth conductive pattern 614 may extend in a first direction (e.g., a +y direction) from the first point P1 of the second region 412 and be formed up to the second point P2 of the first region 411, and may extend in a second direction (e.g., a −x direction) from the second point P2 of the first region 411 to the second region 412.

According to one or more embodiments, the wireless communication circuit 510 may feed power to the fourth conductive pattern 614 to transmit and/or receive an RF signal of a specified frequency band. For example, the specified frequency band may include 600 to 1000 MHz bands. However, the 600 to 1000 MHz frequency bands are an example, and the specified frequency band may vary depending on an electrical length and/or impedance matching of the fourth conductive pattern 614.

Figure 6D:
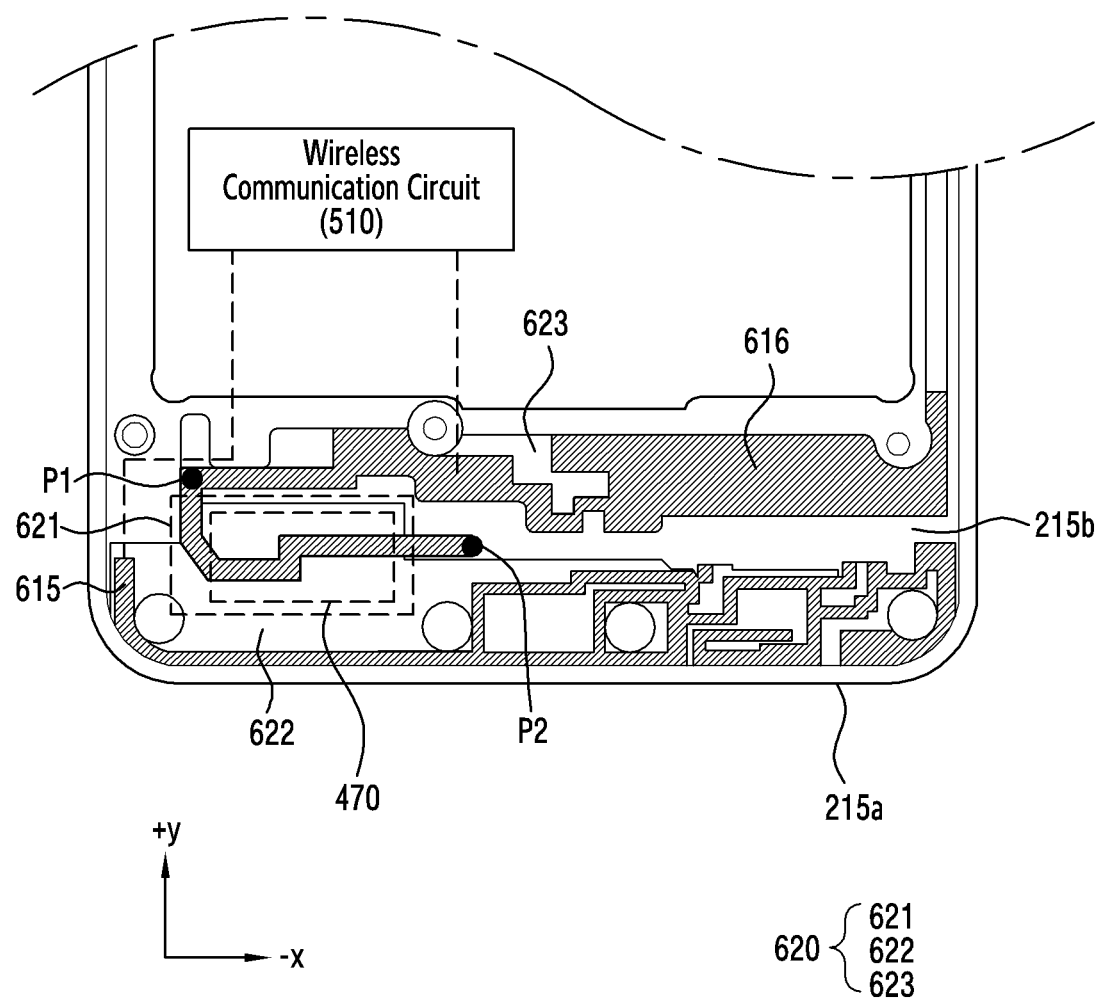
FIG. 6D illustrates a film according to one or more embodiments of the disclosure.

FIG. 6D illustrates a film according to one or more embodiments.

Referring to FIG. 6D, the electronic device 101 according to one or more embodiments may include a third film 620. The third film 620 may be disposed to the second portion 215b of the first frame 215.

According to one or more embodiments, a fifth conductive pattern 615 and a sixth conductive pattern 616 may be formed in the third film 620. The third film 620 may have a shape different from the first film 410 of FIG. 6A. The third film 620 may include a first region 621 covering the entirety of the opening 470, a second region 622 extending from the first region 621 and disposed adjacent to the first portion 215a of the first frame 215, and a third region 623 coupled to the first region 621. As a result, the third film 620 may have a shape in which the first film 410 and second film 420 of FIG. 6A are coupled.

According to one or more embodiments, the third film 620 may include the fifth conductive pattern 615 and the sixth conductive pattern 616. The fifth conductive pattern 615 may be formed to be long in the second region 622 along the first portion 215a of the first frame 215. A portion of the sixth conductive pattern 616 may extend in a first direction (e.g., a −y direction) from the first point P1 of the third region 623 and extend to the second point P2 of the second region 622 across the first region 621.

According to one or more embodiments, the wireless communication circuit 510 may feed power to the fifth conductive pattern 615 and/or the sixth conductive pattern 616 to transmit and/or receive an RF signal of a specified frequency band. For example, the specified frequency band may include 600 to 1000 MHz bands. However, the 600 to 1000 MHz frequency bands are an example, and the specified frequency band may vary depending on an electrical length and/or impedance matching of the fifth conductive pattern 615 and the sixth conductive pattern 616.

Figure 7:
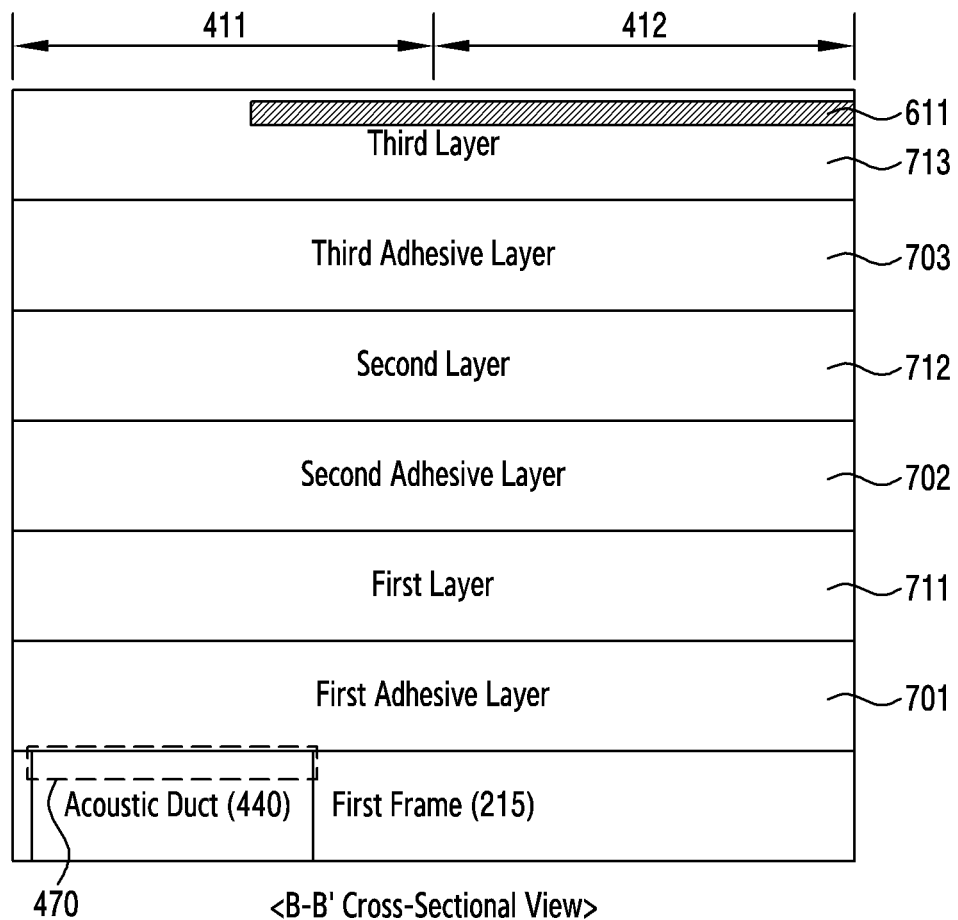
FIG. 7 illustrates a B-B' cross-sectional view of a first film of FIG. 6A according to one or more embodiments of the disclosure.

FIG. 7 illustrates a B-B' cross-sectional view of a first film according to one or more embodiments of FIG. 6A.

Referring to FIG. 7, the first film 410 according to one or more embodiments may include a first layer 711, a second layer 712, and a third layer 713, and may include a first adhesive layer 701 adhering the first layer 711 and the first frame 215, a second adhesive layer 702 adhering the first layer 711 and the second layer 712, and a third adhesive layer 703 adhering the second layer 712 and the third layer 713. The first film 410 may include the first conductive pattern 611 formed in the third layer 713. The first conductive pattern 611 may be utilized as an antenna radiator for wireless communication. For example, the wireless communication circuit 510 may feed power to a point of the first conductive pattern 611 to transmit and/or receive an RF signal of a specified frequency band. According to one or more embodiments, the first film 410 may correspond to a multi-layered Flexible Printed Circuit Board (FPCB) including a plurality of layers (e.g., the first layer 711, the second layer 712, and the third layer 713), and since the wireless communication circuit 510 feeds power to a point of the first conductive pattern 611 to transmit and/or receive the RF signal of the specified frequency band, the first film 410 may also be used as an FPCB antenna.

According to one or more embodiments, the first conductive pattern 611 may include metal (e.g., silver, copper). The first conductive pattern 611 may be formed in the first region 411 and second region 412 of the first film 410.

According to one or more embodiments, the first layer 711 may include a polymer film formed of polyamide and/or Polyethylene Terephthalate (PET). According to one or more embodiments, the second layer 712 may include a conductive material (e.g., copper (Cu), nickel (Ni)). The second layer 712 may include a ground in a region, and the ground may correspond to a ground for operating the first conductive pattern 611 as an antenna radiator. In addition, since the first region 411 and second region 412 of the first film 410 include the second layer 712 including a conductive material, the electronic device 101 may ensure rigidity of the first film 410. According to one or more embodiments, the third layer 713 may include a polymer film formed of polyamide and/or PET. The third layer 713 may cover the first conductive pattern 611 to protect the first conductive pattern 611 from an external environment.

According to one or more embodiments, one or more of the first adhesive layer 701, the second adhesive layer 702, and/or the third adhesive layer 703 may include an adhesive material. For example, the first adhesive layer 701, the second adhesive layer 702, and/or the third adhesive layer 703 may include a tape.

According to one or more embodiments, the first film 410 may further include a heat dissipation layer formed of graphite and/or ferrite. The heat dissipation layer may facilitate dissipating of heat generated by electronic components of the electronic device 101 to the outside of the electronic device 101. According to one or more embodiments, the second layer 712 of the first film 410 may include graphite and/or ferrite without having to include a conductive material (e.g., copper). In this case, the second layer 712 including one or more of graphite and/or ferrite may function as a heat dissipation layer which radiates heat generated by the electronic components in the electronic device 101. According to one or more embodiments, the second layer 712 of the first film 410 may include a conductive material (e.g., copper), graphite, and/or ferrite. In this case, the second layer 712 may function as the heat dissipation layer.

Figure 8:
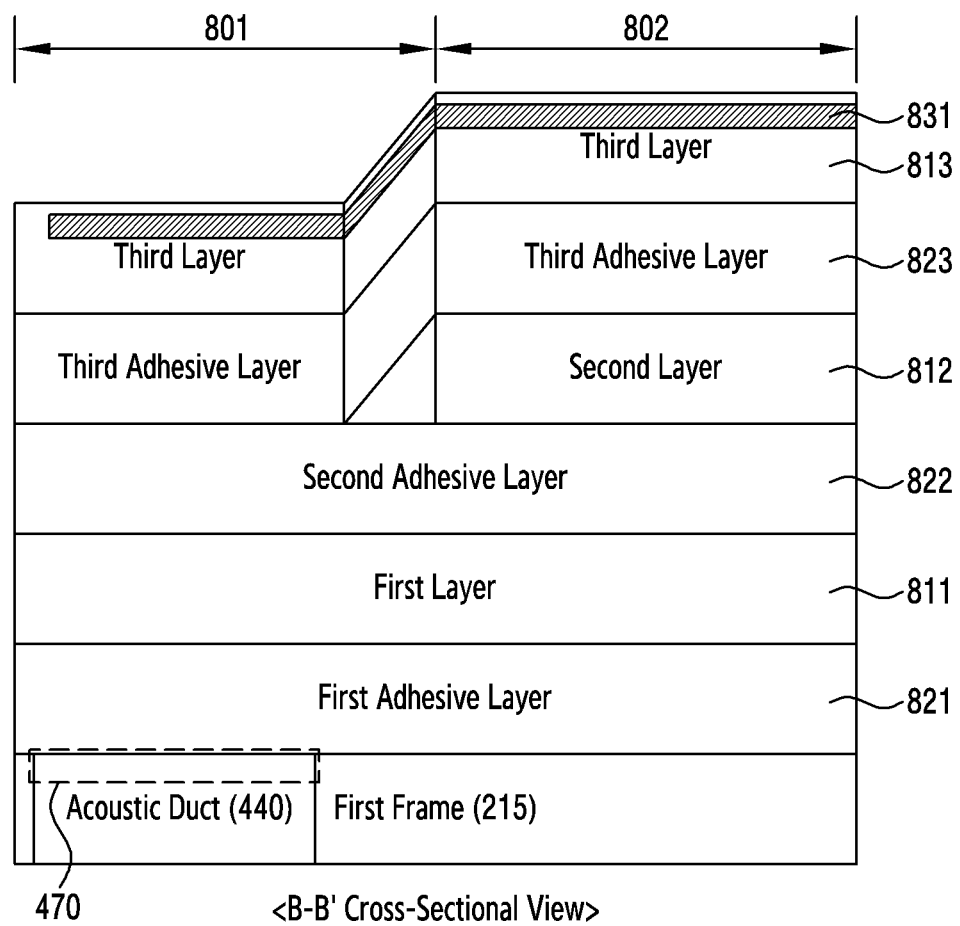
FIG. 8 illustrates a B-B' cross-sectional view of the first film of FIG. 6A according to one or more embodiments of the disclosure.

FIG. 8 illustrates a B-B' cross-sectional view of the first film of FIG. 6A according to one or more embodiments.

Referring to FIG. 8, a first film 810 according to one or more embodiments may include a first region 801 and a second region 802. The first region 801 and the second region 802 may correspond to the first region 411 and second region 412 of FIG. 7, in that order. For example, the first region 801 of the first film 810 may cover the opening 470 of the first frame 215, and the second region 802 may mean a region extending from the first region 801.

The first film 810 according to one or more embodiments may include a first layer 811, a second layer 812, and a third layer 813, and may include a first adhesive layer 821 adhering the first layer 811 and the first frame 215, a second adhesive layer 822 adhering the first layer 811 and the second layer 812, and a third adhesive layer 823 adhering the second layer 812 and the third layer 813.

Compared to the first film 410 of FIG. 7, the first region 801 of the first film 810 according to one or more embodiments may not include the second layer 812. For example, the second layer 812 including a conductive material (e.g., Cu) may be included only in the second region 802, and may not be included in the first region 801. In an embodiment, since the first region 801 does not include the second layer 812, the electronic device 101 may save manufacturing cost of the first film 810 compared to a case where the second layer 812 is included in the first region 801.

According to one or more embodiments, descriptions on the first layer 811, third layer 813, first adhesive layer 821, second adhesive layer 822, third adhesive layer 823, and first conductive pattern 831 may correspond to descriptions on the first layer 711, third layer 713, first adhesive layer 701, second adhesive layer 702, third adhesive layer 703, and first conductive pattern 611 of FIG. 7, in that order. For example, the first adhesive layer 821 may adhere the first frame 215 and the first layer 811, and the second adhesive layer 822 may adhere the first layer 811 and the second layer 812.

Figure 9A:
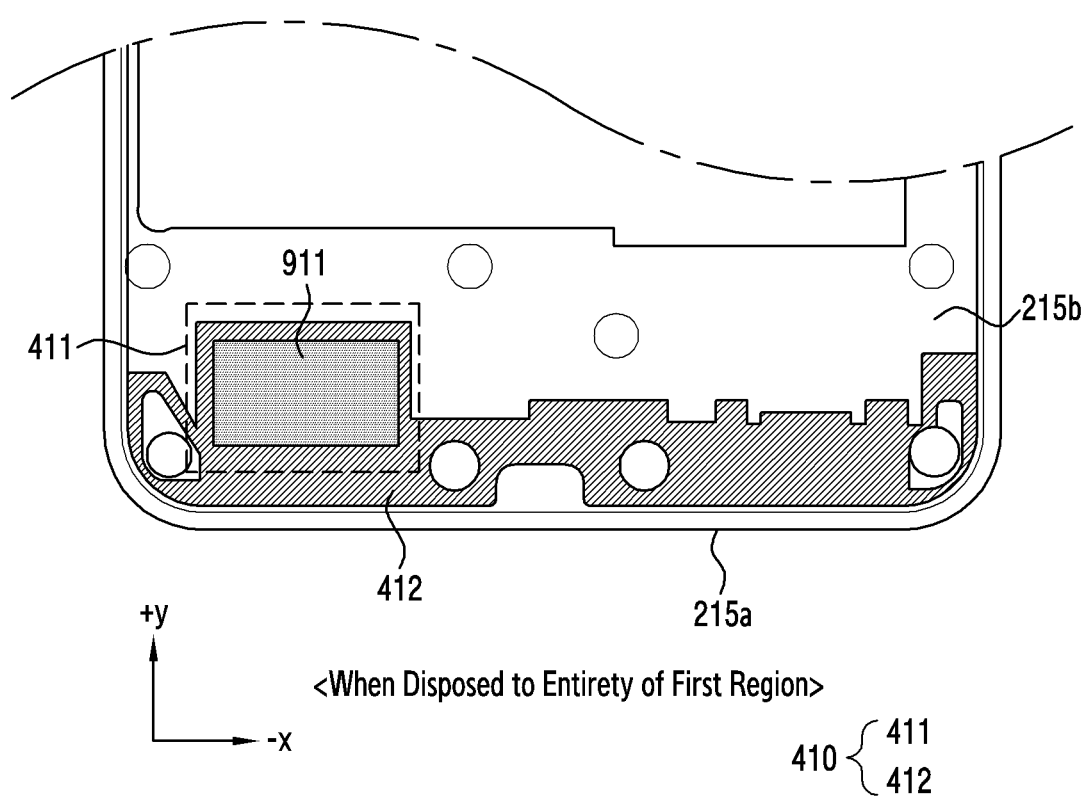
FIG. 9A illustrates a second layer disposed to the entirety of a first region according to an embodiment.

FIG. 9A illustrates a second layer disposed to the entirety of a first region according to one or more embodiments.

Figure 9B:
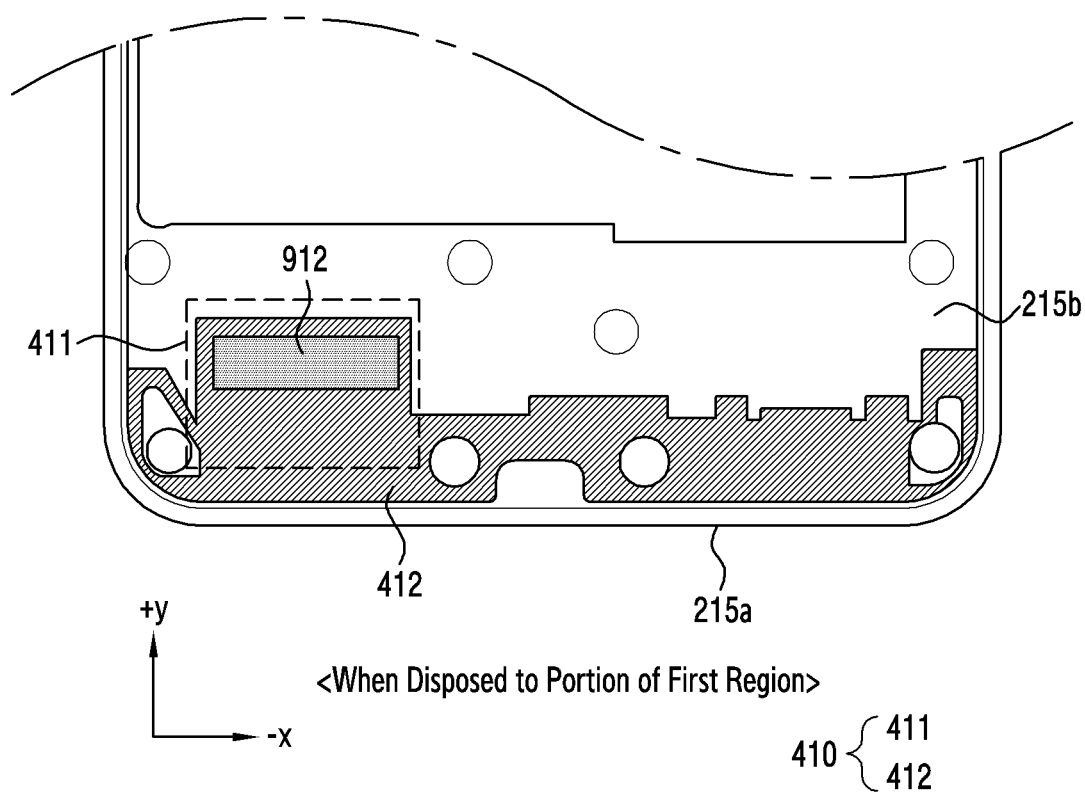
FIG. 9B illustrates a second layer disposed to a portion of a first region according to one or more embodiments of the disclosure.

FIG. 9B illustrates a second layer disposed to a portion of a first region according to one or more embodiments.

Figure 9C:
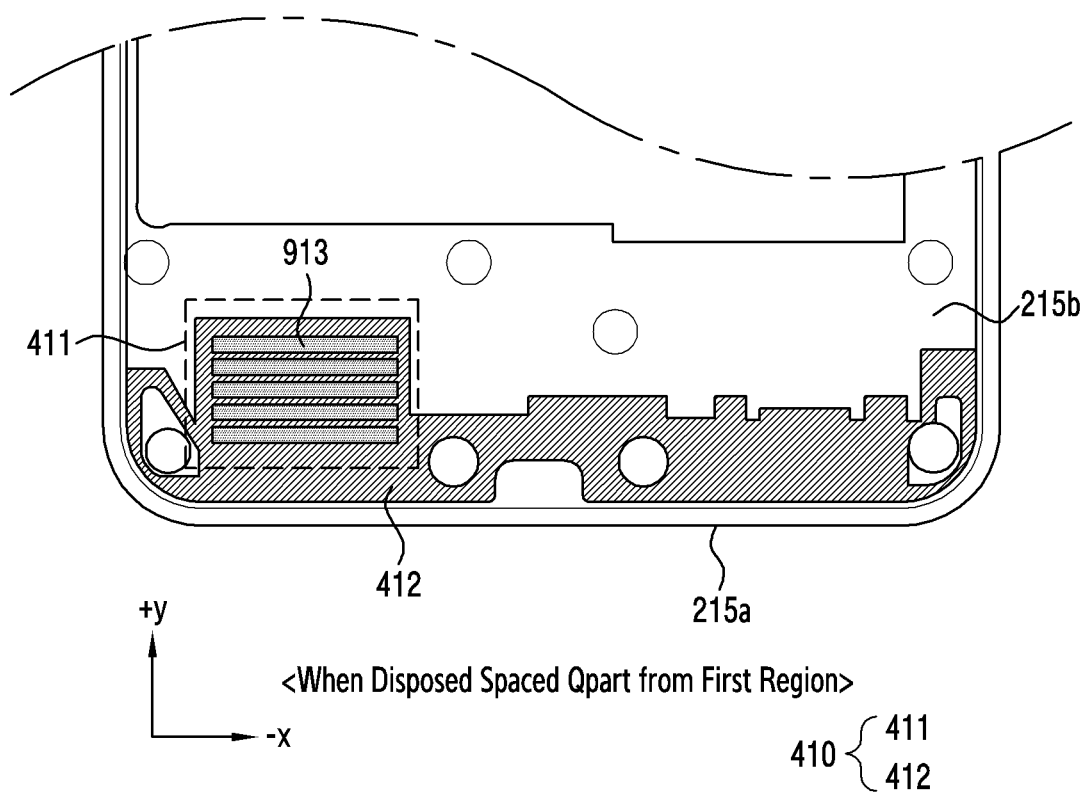
FIG. 9C illustrates a second layer disposed spaced apart from a first region according to one or more embodiments of the disclosure.

FIG. 9C illustrates a second layer disposed spaced apart from a first region according to one or more embodiments.

Figure 9D:
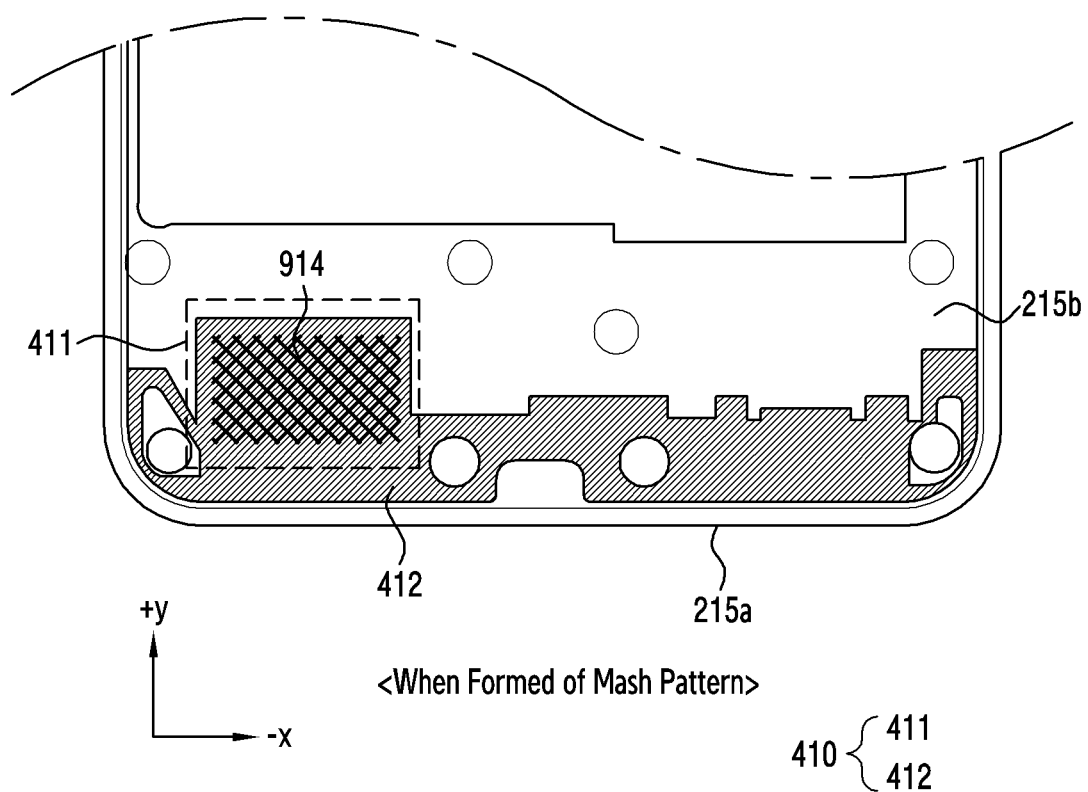
FIG. 9D illustrates a second layer formed in a mesh pattern according to one or more embodiments of the disclosure.

FIG. 9D illustrates a second layer formed in a mesh pattern according to one or more embodiments.

Referring to FIG. 9A, FIG. 9B, FIG. 9C, and FIG. 9D, a second layer according to one or more embodiments (e.g., the second layer 712 of FIG. 7) may have various shapes and sizes and be disposed to the first region 411 of the first film 410. For example, referring to FIG. 9A, the second layer 911 may be disposed to the entirety of the first region 411 of the first film 410. In an example, since the second layer 911 is disposed to the entirety of the first region 411, the electronic device 101 may ensure rigidity of the first film 410 in the first region 411. In an example, when it is said that the second layer 911 is disposed to the entirety of the first region 411, it is for comparison with a case of being disposed in part shown in FIG. 9B, and it does not necessarily mean that the second layer 911 is disposed throughout the entirety of the first region 411. For example, the second layer 911 may be disposed to most of the first region 411, and may not be disposed to a portion of the first region 411. In addition, the second layer 911 of FIG. 9A is illustrated to have a rectangular shape, but without being limited thereto, may have various shapes.

As another example, referring to FIG. 9B, a second layer 912 may be disposed to a portion of the first region 411 of the first film 410. In an example, since the second layer 912 is disposed to the portion of the first region 411, the electronic device 101 may minimize influence of the second layer 912 on a conductive pattern. For example, the second layer 912 may include a conductive material (e.g., copper, nickel), and when the conductive pattern of the first film 410 is used as an antenna radiator, the second layer 912 may have effect on antenna performance. However, since the second layer 912 is disposed to the portion of the first region 411 of the first film 410, the electronic device 101 may minimize the influence of the second layer 712 on the antenna performance. A size of the second layer 912 of FIG. 9B is only an example for comparison with FIG. 9A, and the second layer 912 may have various shapes. In addition, although it is illustrated that the second layer 921 has a rectangular shape, without being limited thereto, the second layer 912 may have various shapes.

As another example, referring to FIG. 9C, a second layer 913 may be disposed spaced apart from the first region 411 of the first film 410. In an example, since the second layer 913 is disposed spaced apart from the first region 411, the electronic device 101 may minimize the influence on the conductive pattern of the second layer 913, thereby minimizing the influence on the antenna performance of the second layer 913. The second layer 913 of FIG. 9C is an example, and the second layer 913 may have various sizes and shapes.

As another example, referring to FIG. 9D, a second layer 914 may be formed in a mesh pattern. In an example, since the second layer 914 is formed in the mesh pattern, the electronic device 101 may minimize the influence on the conductive pattern of the second layer 712, thereby minimizing the influence on the antenna performance of the second layer 712. The second layer 914 of FIG. 9D is an example, and the second layer 914 may have various sizes and shapes.

Figure 10A:
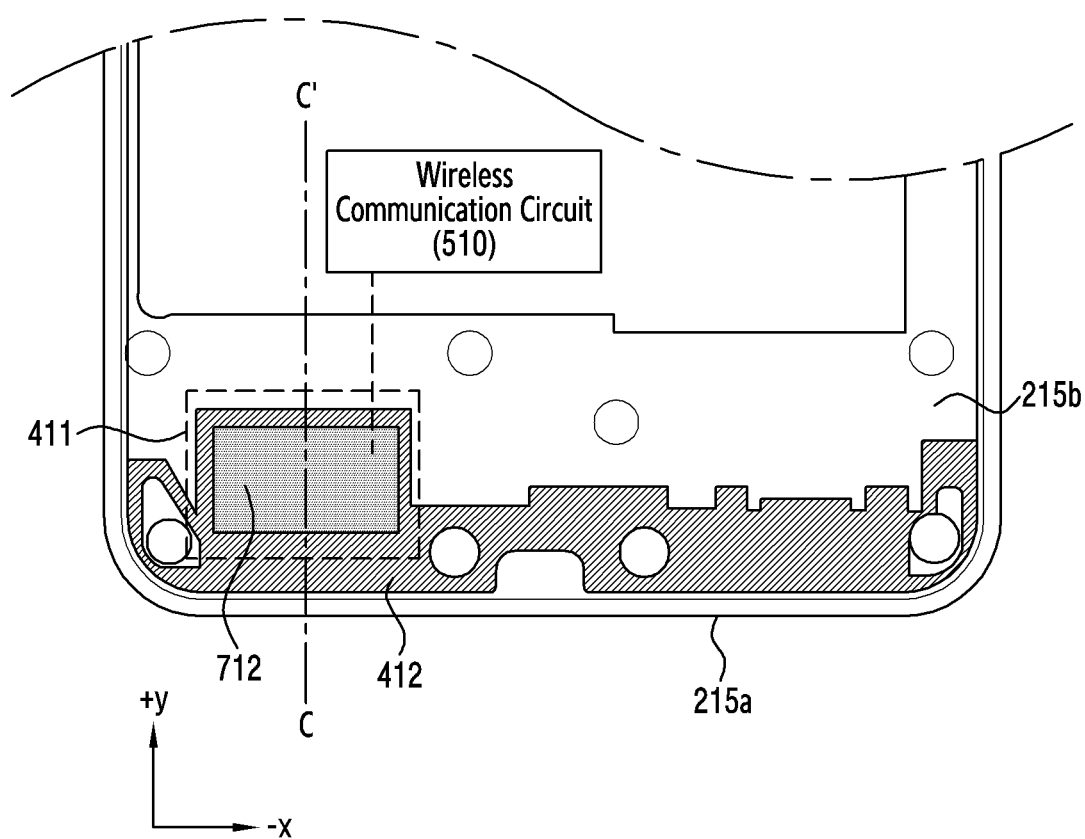
FIG. 10A illustrates a second layer utilized as an antenna radiator according to one or more embodiments of the disclosure.

FIG. 10A illustrates a second layer utilized as an antenna radiator according to one or more embodiments.

Figure 10B:
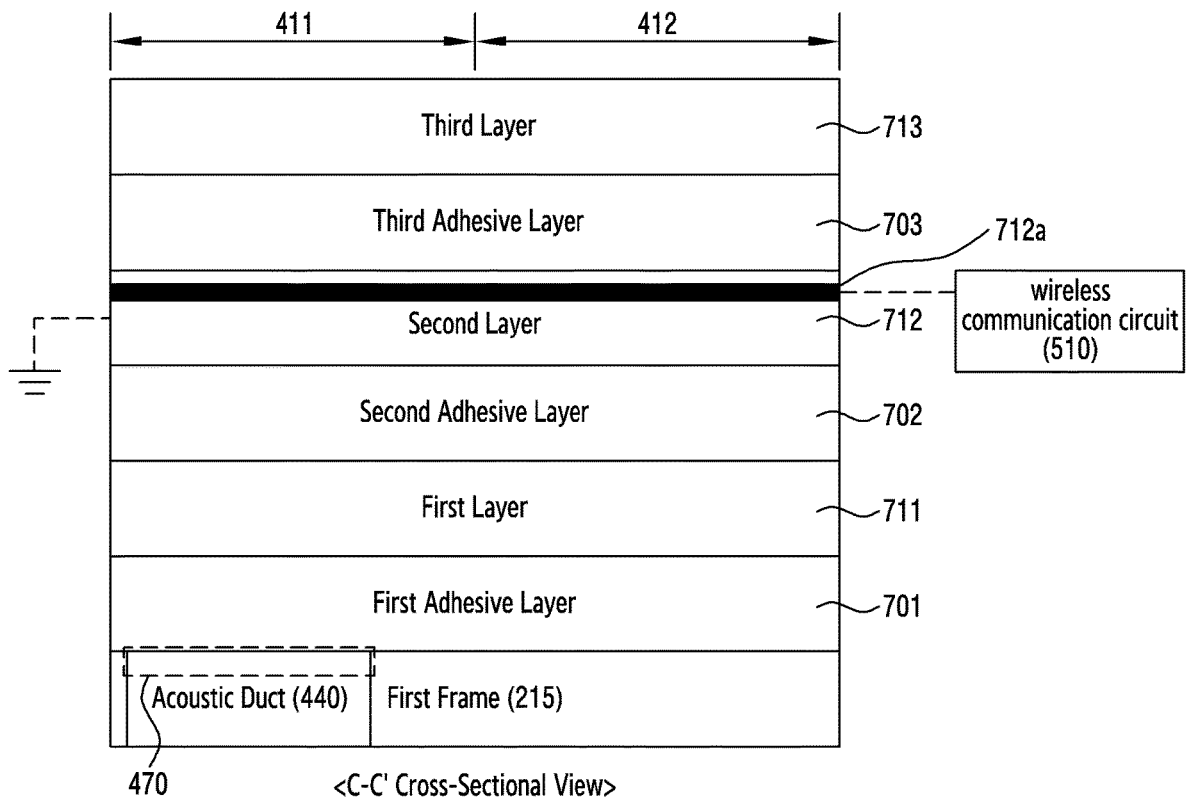
FIG. 10B illustrates a C-C' cross-sectional view of a second layer according to one or more embodiments of the disclosure.

FIG. 10B illustrates a C-C' cross-sectional view of a second layer according to one or more embodiments.

Referring to FIG. 10A and FIG. 10B, the second layer 712 according to one or more embodiments may include a conductive layer 712a utilizable as an antenna radiator. The wireless communication circuit 510 according to an embodiment may feed power to the conductive layer 712a of the second layer 712 of the first film 410 to transmit and/or receive an RF signal of a specified frequency band (e.g., a second frequency band). According to one or more embodiments, since the conductive layer 712a of the second layer 712 including a conductive material (e.g., copper) is utilized as an antenna radiator, the electronic device 101 may increase usability of the first film 410. In addition, the electronic device 101 utilizes the conductive layer 712a of the second layer 712 as the antenna radiator, thereby decreasing necessity of ensuring an additional antenna radiator.

Figure 11:
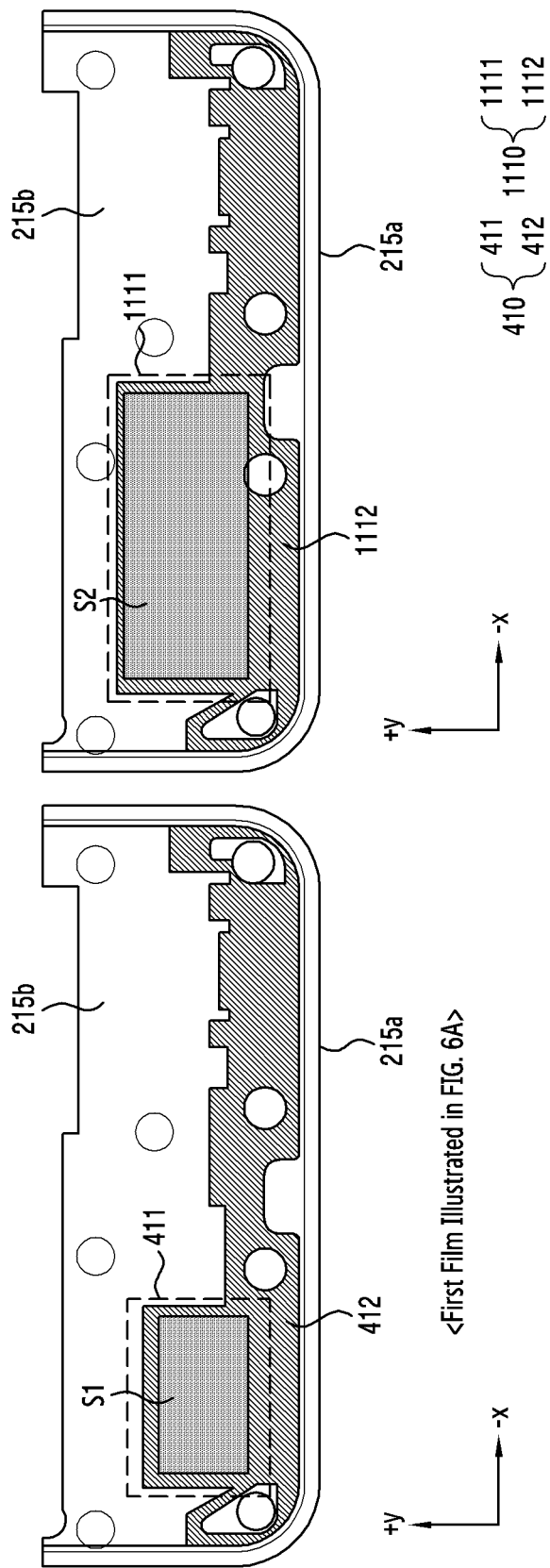
FIG. 11 illustrates a size of a first region of a first film according to one or more embodiments of the disclosure.

FIG. 11 illustrates a size of a first region of a first film according to one or more embodiments.

Referring to FIG. 11, the first region 411 of the first film 410 according to an embodiment of FIG. 6A may have a first size S1. On the other hand, a first region 1111 of a first film 1110 according to one or more embodiments may have a second size S2 greater than the first size S1. According to one or more embodiments, the electronic device 101 includes the first region 1111 having a relatively greater size, thereby more ensuring a region in which conductive patterns utilized as an antenna radiator may be formed.

Accordingly, a first film (e.g., the first film 410 of FIG. 6A) may have various sizes and is not limited to the size of FIG. 6A and FIG. 11A.

The electronic device 101 according to one or more embodiments of the disclosure may include the display 201 disposed at a front surface of the electronic device 101, the rear cover 211 which forms a rear surface of the electronic device 101, the first frame 215 formed of a non-conductive material at least in part and including the first portion 215a which forms the side surface 210C of the electronic device 101 and the second portion 215b extending from the first portion 215a to be parallel to the rear cover 211 in a first direction which is toward the inside of the electronic device 101, the second frame 216 disposed between the display 201 and the second portion 215b of the first frame 215 and forming the space 216a between the second frame and the second portion 215b of the first frame 215 since the second frame is coupled to the second portion 215b of the first frame 215, the speaker 430 disposed to the space 216a, the acoustic duct 440 disposed to the first frame 215, the first film 410 including the first conductive pattern 611, and the wireless communication circuit 510 electrically coupled to the first conductive pattern 611. The acoustic duct 440 may include the first acoustic duct portion 441 extending from the space 216a to the at least one speaker hole 207 across the second portion 215b of the first frame 215 and the first portion 215a, and the second acoustic duct portion 442 extending from a portion of the first acoustic duct portion 441 in a second direction from the display 201 toward the rear cover 211 to form the opening 470 in the second portion 215*b* of the first frame 215. The first film 410 may be disposed to a surface of the second portion 215*b* of the first frame 215. At least one region of the first film 410 may cover the entirety of the opening 470. The wireless communication circuit 510 may feed power to a point of the first conductive pattern 611 to receive a signal of a first frequency band.

According to one or more embodiments, the first film 410 may include the first region 411 covering the entirety of the opening 470, and the second region 412 extending from the first region 411 and disposed adjacent to the first portion 215*a* of the first frame 215.

According to one or more embodiments, the first film 410 may include the second layer 812 formed of copper, and the second layer 812 may be located only in the second region 412 of the first film 410.

According to one or more embodiments, the first conductive pattern 611 may extend from a first point of the first region 411 to a second point of the second region 412.

According to one or more embodiments a portion of the first conductive pattern 611 may be elongated with the first side surface from the second region 412.

According to one or more embodiments, the first film 410 may include the second layer 812 formed of a conductive material.

According to one or more embodiments, the second layer 812 may be formed in a mesh pattern.

According to one or more embodiments, the wireless communication circuit 510 may feed power to the second layer 812 to receive a signal of a second frequency band.

According to one or more embodiments, the first film 410 may include the second layer 812 formed of at least one of graphite or ferrite.

According to one or more embodiments, the first film 410 may correspond to a flexible printed circuit board (FPCB).

According to one or more embodiments, the first portion 215*a* of the first frame 215 may be formed of a conductive material, and the second portion 215*b* of the first frame 215 may be formed of a non-conductive material.

According to one or more embodiments, the first frame 215 may be formed of a non-conductive material.

According to one or more embodiments, the acoustic duct 440 may connect the space 216*a* to the outside of the electronic device 101, and sound radiated by the speaker 430 may be radiated to the outside of the electronic device via the acoustic duct 440.

According to one or more embodiments, the second frame 216 may be coupled to a rear surface of the display 201.

According to one or more embodiments, at least part of the rear cover 211 may include a non-conductive material.

The electronic device 101 according to one or more embodiments of the disclosure may include the display 201 disposed at a front surface of the electronic device 101, the rear cover 211 which forms a rear surface of the electronic device 101, the first frame 215 formed of a non-conductive material at least in part and including the first portion 215*a* which forms the side surface 210C of the electronic device 101 and the second portion 215*b* extending from the first portion 215*a* to be parallel to the rear cover 211 in a first direction which is toward the inside of the electronic device 101, the second frame 216 disposed between the display 201 and the second portion 215*b* of the first frame 215 and forming the space 216*a* between the second frame and the second portion 215*b* of the first frame 215 since the second frame is coupled to the second portion 215*b* of the first frame 215, the speaker 430 disposed to the space 216*a*, the acoustic duct 440 disposed to the first frame 215, the first film 410 including the first conductive pattern 611, and the wireless communication circuit 510 electrically coupled to the first conductive pattern 611. The acoustic duct 440 may include the first acoustic duct portion 441 extending from the space 216*a* to the at least one speaker hole 207 across the second portion 215*b* of the first frame 215 and the first portion 215*a*, and the second acoustic duct portion 442 extending from a portion of the first acoustic duct portion 441 in a second direction from the display 201 toward the rear cover 211 to form the opening 470 in the second portion 215*b* of the first frame 215. The first film 410 may be disposed to a surface of the second portion 215*b* of the first frame 215. The first film 410 may include the first region 411 covering the entirety of the opening 470 and the second region 412 extending from the first region 411 and disposed adjacent to the first portion 215*a* of the first frame 215. The wireless communication circuit 510 may feed power to a point of the first conductive pattern 611 to receive a signal of a first frequency band.

According to one or more embodiments, the first film 410 may include the second layer 812 formed of a conductive material.

According to one or more embodiments, the second layer 812 may be formed in a mesh pattern.

According to one or more embodiments, the second layer 812 may be located only in the second region 412 of the first film 410.

According to one or more embodiments, the wireless communication circuit 510 may feed power to the second layer 812 to receive a signal of a second frequency band.

The above-described embodiments are merely examples to describe technical content according to the embodiments of the disclosure and help the understanding of the embodiments of the disclosure, and are not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein

What is claimed is:
1. An electronic device comprising:
 a display disposed at a front surface of the electronic device;
 a rear cover forming a rear surface of the electronic device;
 a first frame comprising:
  a first portion which forms a first side surface of the electronic device, wherein at least one speaker hole is formed in a region of the first portion; and
  a second portion extending from the first portion and parallel to the rear cover in a first direction toward an inside of the electronic device, wherein at least one of the first portion and the second portion comprises a non-conductive material, and
 a second frame disposed between the display and the second portion of the first frame and coupled to the second portion of the first frame;
 a speaker disposed in a first space between the second frame and the second portion of the first frame;
 an acoustic duct provided in the first frame, the acoustic duct comprising:
  a first acoustic duct portion extending from the first space to the at least one speaker hole across the second portion of the first frame and the first portion, and a second acoustic duct portion extending from the first acoustic duct portion in a second direction which is from the display toward the rear cover, to provide an opening in the second portion of the first frame;
a film comprising a conductive pattern, wherein the film is disposed on a surface of the second portion of the first frame, and at least a portion of the film covers an entirety of the opening; and
a wireless communication circuit electrically coupled to the conductive pattern and configured to feed power to a point of the conductive pattern to receive a signal of a first frequency band.

2. The electronic device of claim 1, wherein the film comprises:
a first region covering the entirety of the opening; and
a second region extending from the first region and adjacent to the first portion of the first frame.

3. The electronic device of claim 2, wherein the film further comprises a first layer provided in only the second region of the film and formed of copper.

4. The electronic device of claim 2, wherein the conductive pattern extends from a first point of the first region to a second point of the second region.

5. The electronic device of claim 2, wherein a portion of the conductive pattern is elongated from the second region to the first side surface.

6. The electronic device of claim 1, wherein the film comprises a first layer formed of a conductive material.

7. The electronic device of claim 6, wherein the first layer is formed in a mesh pattern.

8. The electronic device of claim 6, wherein the wireless communication circuit is further configured to feed power to the first layer to receive a signal of a second frequency band.

9. The electronic device of claim 1, wherein the film comprises a first layer comprising at least one of graphite or ferrite.

10. The electronic device of claim 1, wherein the film is a flexible printed circuit board.

11. The electronic device of claim 1, wherein the first portion of the first frame comprises a conductive material, and
wherein the second portion of the first frame comprises the non-conductive material.

12. The electronic device of claim 1, wherein the first frame comprises the non-conductive material.

13. The electronic device of claim 1, wherein the acoustic duct connects the first space to an outside of the electronic device, and
wherein sound radiated by the speaker is radiated to the outside of the electronic device via the acoustic duct.

14. The electronic device of claim 1, wherein the second frame is coupled to a rear surface of the display.

15. The electronic device of claim 1, wherein at least a portion of the rear cover comprises a non-conductive material.

16. An electronic device comprising:
a display disposed on a front surface of the electronic device;
a rear cover forming a rear surface of the electronic device;
a first frame including a non-conductive material, wherein the first frame includes:
a first portion which forms a first side surface of the electronic device, wherein at least one speaker hole is formed in the first portion, and
a second portion extending in a first direction from the first portion toward an inside of the electronic device to be parallel with the rear cover;
a second frame disposed between the display and the second portion of the first frame, wherein a first space between the second frame and the second portion of the first frame is formed as the second frame and the second portion of the first frame are coupled;
a speaker disposed in the first space;
an acoustic duct formed in the first frame, wherein the acoustic duct includes:
a first acoustic duct portion extending from the first space to the at least one speaker hole across the second portion of the first frame and the first portion, and
a second acoustic duct portion extending from a portion of the first acoustic duct portion in a second direction from the display toward the rear cover to form an opening in the second portion of the first frame;
a film including a conductive pattern, wherein the film is disposed on a surface of the second portion of the first frame, and wherein the film includes:
a first region covering an entirety of the opening, and
a second region extending from the first region and disposed adjacent to the first portion of the first frame; and
a wireless communication circuit electrically connected to the conductive pattern and configured to feed power to the conductive pattern to receive a signal of a first frequency band.

17. The electronic device of claim 16, wherein the film includes a first layer formed of a conductive material.

18. The electronic device of claim 17, wherein the first layer is formed in a mesh pattern.

19. The electronic device of claim 17, wherein the first layer is only located on the second region of the film.

20. The electronic device of claim 17, wherein the wireless communication circuit is configured to feed the first layer to receive a signal of a second frequency band.

* * * * *